(12) United States Patent
Igarashi et al.

(10) Patent No.: US 8,976,551 B2
(45) Date of Patent: Mar. 10, 2015

(54) POWER CONVERTER

(75) Inventors: Hiroaki Igarashi, Hitachinaka (JP);
Satoru Shigeta, Hitachinaka (JP);
Takashi Ogura, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 125 days.

(21) Appl. No.: 13/885,934

(22) PCT Filed: Dec. 7, 2010

(86) PCT No.: PCT/JP2010/071926
§ 371 (c)(1),
(2), (4) Date: May 16, 2013

(87) PCT Pub. No.: WO2012/077187
PCT Pub. Date: Jun. 14, 2012

(65) Prior Publication Data
US 2014/0092655 A1 Apr. 3, 2014

(51) Int. Cl.
*H02M 1/32* (2007.01)
*H02H 7/122* (2006.01)
(Continued)

(52) U.S. Cl.
CPC ............... *H02H 7/122* (2013.01); *B60L 3/003* (2013.01); *H02M 1/32* (2013.01); *H02P 27/08* (2013.01); *B60L 11/1803* (2013.01);
(Continued)

(58) Field of Classification Search
CPC ... H02M 1/32; H02M 2001/327; H02M 7/48; H02M 7/53; H02M 7/53846; H02M 7/5387
USPC ............ 363/55, 56.02, 56.03, 56.05, 98, 132; 361/91.1
See application file for complete search history.

(56) References Cited

U.S. PATENT DOCUMENTS 5,412,558 A * 5/1995 Sakurai et al. .................. 363/98
5,491,622 A * 2/1996 Carosa ....................... 363/56.02
(Continued)

FOREIGN PATENT DOCUMENTS

JP          9-47055 A      2/1997
JP       2003-88093 A      3/2003
(Continued)

OTHER PUBLICATIONS

International Search Report dated Mar. 8, 2011 with English translation (Three (3) pages).

*Primary Examiner* — Gary L Laxton
(74) *Attorney, Agent, or Firm* — Crowell & Moring LLP

(57) ABSTRACT

A power converter includes an inverter unit that includes a plurality of semiconductor switching elements constituting upper and lower arms and converts DC power into AC power; a gate driving unit that outputs, to the inverter unit, a gate signal used to drive gates of the plurality of semiconductor switching elements; a driving control unit that supplies the gate driving unit with a switching control signal used for the gate driving unit to output the gate signal; a first abnormality detection unit that performs over voltage detection of the DC power and over current detection of the AC power and temperature detection of the upper and lower arms; and a second abnormality detection unit that detects abnormality of the plurality of semiconductor switching elements of the upper arm and lower arms, wherein the driving control unit includes a first protection circuit and a second protection circuit.

15 Claims, 9 Drawing Sheets

(51) Int. Cl.
  *B60L 3/00*      (2006.01)
  *H02P 27/08*    (2006.01)
  *B60L 11/18*    (2006.01)
  *B60L 15/00*    (2006.01)
  *H02M 7/53846* (2007.01)

(52) U.S. Cl.
  CPC ....... *B60L 15/007* (2013.01); *H02M 2001/327* (2013.01); *Y02T 10/7005* (2013.01); *Y02T 10/644* (2013.01); *Y02T 10/70* (2013.01)
  USPC .................................................. 363/56.02

(56) References Cited

U.S. PATENT DOCUMENTS

| | | | | |
|---|---|---|---|---|
| 6,058,036 | A * | 5/2000 | Endo et al. | 363/98 |
| 6,683,799 | B2 * | 1/2004 | Kato et al. | 363/37 |
| 7,733,616 | B2 * | 6/2010 | Yamada | 361/31 |
| 8,049,455 | B2 * | 11/2011 | Kitanaka | 318/563 |
| 8,837,178 | B2 * | 9/2014 | Fornage | 363/56.02 |
| 2004/0114400 | A1 * | 6/2004 | Shinba | 363/56.02 |
| 2004/0196678 | A1 | 10/2004 | Yoshimura et al. | |
| 2009/0128117 | A1 * | 5/2009 | Ochiai et al. | 323/299 |
| 2010/0025126 | A1 | 2/2010 | Nakatsu et al. | |
| 2011/0157931 | A1 * | 6/2011 | Sato | 363/56.02 |
| 2012/0020136 | A1 | 1/2012 | Akaishi et al. | |

FOREIGN PATENT DOCUMENTS

| | | |
|---|---|---|
| JP | 2004-312817 A | 11/2004 |
| JP | 2010-35347 A | 2/2010 |
| JP | 2010-104187 A | 5/2010 |
| JP | 2010-206909 A | 9/2010 |
| JP | 2010-245910 A | 10/2010 |
| JP | 2012-5229 A | 1/2012 |

* cited by examiner

FIG. 8

| Trigger | ELECTRICAL MOTOR CONTROL MICROCOMPUTER (206) | BUFFER (201) | BUFFER (202a) | BUFFER (202b) | BUFFER (203) | Output |
|---|---|---|---|---|---|---|
| GATE FAULT | - | - | - | - | OFF | 3 PHASE OPEN BY 203 |
| LOWER ARM 3 PHASE SHORT BY OCCURRENCE OF OVERVOLTAGE | - | OFF | ON | OFF | ON | LOWER ARM 3 PHASE SHORT BY 201 AND 202b |
| UPPER ARM 3 PHASE SHORT BY OCCURRENCE OF OVERVOLTAGE | - | OFF | OFF | ON | ON | UPPER ARM 3 PHASE SHORT BY 201 AND 202a |
| LOWER ARM 3 PHASE SHORT BY OCCURRENCE OF OVERCURRENT | - | OFF | ON | OFF | ON | LOWER ARM 3 PHASE SHORT BY 201 AND 202b |
| UPPER ARM 3 PHASE SHORT BY OCCURRENCE OF OVERCURRENT | - | OFF | OFF | ON | ON | UPPER ARM 3 PHASE SHORT BY 201 AND 202a |
| LOWER ARM 3 PHASE SHORT BY MAIN MICROCOMPUTER | - | OFF | ON | OFF | ON | LOWER ARM 3 PHASE SHORT BY 201 AND 202b |
| UPPER ARM 3 PHASE SHORT BY MAIN MICROCOMPUTER | - | OFF | OFF | ON | ON | UPPER ARM 3 PHASE SHORT BY 201 AND 202a |
| 3 PHASE OPEN BY MAIN MICROCOMPUTER | - | OFF | ON | ON | ON | 3 PHASE OPEN BY 201 |
| LOWER ARM 3 PHASE SHORT BY ELECTRICAL MOTOR CONTROL MICROCOMPUTER | LOWER ARM 3 PHASE SHORT | ON | ON | ON | ON | LOWER ARM 3 PHASE SHORT BY 206 |
| UPPER ARM 3 PHASE SHORT BY ELECTRICAL MOTOR CONTROL MICROCOMPUTER | UPPER ARM 3 PHASE SHORT | ON | ON | ON | ON | UPPER ARM 3 PHASE SHORT BY 206 |
| 3 PHASE OPEN BY ELECTRICAL MOTOR CONTROL MICROCOMPUTER | 3 PHASE SHORT | ON | ON | ON | ON | 3 PHASE OPEN BY 206 |
| PWM BY ELECTRICAL MOTOR CONTROL MICROCOMPUTER | PWM | ON | ON | ON | ON | PWM BY 206 |

ON: NORMAL OUTPUT STATE
OFF: OUTPUT CUTOFF STATE (HIGH IMPEDANCE STATE)

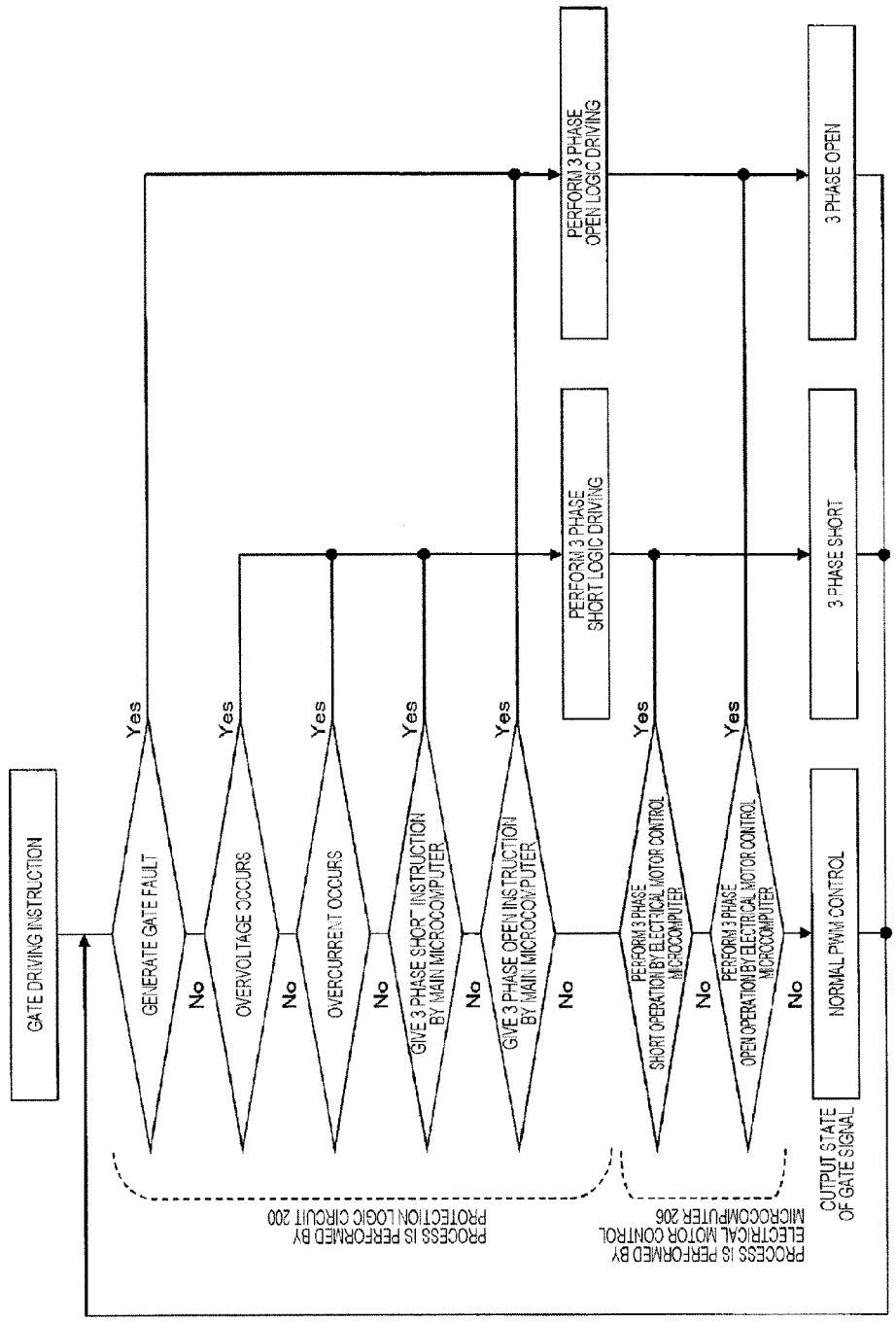

POWER CONVERTER

TECHNICAL FIELD

The present invention relates to a power converter that includes an inverter using a semiconductor switching element, and more particularly, to a power converter that includes a protection circuit.

BACKGROUND ART

There is a known device that performs power conversion by an inverter circuit including a semiconductor switching element, supplies power to a load, and includes a plurality of protection circuits such as over current protection circuits or over voltage protection circuits (for example, see PTL 1). PTL 1 discloses a technology for performing control such that an operation is stopped by urgently stopping an operation of the semiconductor switching element of the inverter circuit at the time of a major failure such as an over current or an over voltage and by slowly decreasing a current flowing in the semiconductor switching element at the time of a minor failure such as overload. That is, the semiconductor switching element enters an open state in which the current does not flow.

Further, PTL 1 discloses a control circuit that detects a failure of the inverter circuit and stops the switching element when the failure of the inverter circuit is detected.

However, when the same method as that of PTL 1 is applied to an electrical motor control inverter circuit, the electrical motor control circuit enters the open state. Therefore, an electrical motor itself freely rotates, and thus its speed gradually decreases. Further, when the electrical motor is driven, the degree of emergency is frequently different between the case of an over current and the case of an over voltage. In PTL 1, however, stopping the operation of the switching element is performed likewise in either case.

PTL 2 discloses an electrical motor control device that includes a safety shutdown circuit in which a plurality of 3-state buffer circuits are installed between a PWM generation circuit and a gate driving circuit of an inverter. The safety shutdown circuit further includes a circuit by which a high-order device can detect whether an operation of the safety shutdown circuit itself is normal.

The 3-state buffer circuit in PTL 2 blocks a PWM signal supplied to a gate driving circuit, and thus an electrical motor enters a free-run state and gradually stops. However, a control input to the 3-state buffer is configured to be manually performed by an external motor stop switch.

PTL 3 discloses a system that stops supplying power from an inverter to an electrical motor by short-circuiting a semiconductor switching element of an upper arm or a lower arm of an inverter circuit, when a failure such as openness of a switch (contactor) supplying direct-current (DC) power from an electrical accumulator to the inverter circuit occurs during driving of an electrical vehicle.

CITATION LIST

Patent Literature

PTL 1: JP 2003-88093 A
PTL 2: JP 2010-104187 A
PTL 3: JP 9-47055 A

SUMMARY OF INVENTION

Technical Problem

In particular, when the power converters are used in driving of the electrical motor, the conventional power converters including the inverter using the semiconductor switching element may not quickly perform optimum failure countermeasure to detect a failure of the inverter and short-circuit or open the inverter circuit based on a situation of the failure, so that the power converters including the inverter circuit are protected and safety is high.

Solution to Problem

According to a first aspect of the present invention, a power converter includes: an inverter unit that includes a plurality of semiconductor switching elements constituting an upper arm and a plurality of semiconductor switching elements constituting a lower arm, and converts DC power into AC power and outputs the AC power; a gate driving unit that outputs, to the inverter unit, a gate signal used to drive gates of the plurality of semiconductor switching elements of the upper and lower arms and turn on/off the semiconductor switching elements; a driving control unit that supplies the gate driving unit with a switching control signal used for the gate driving unit to output the gate signal; a first abnormality detection unit that detects abnormality of the inverter unit by performing over voltage detection of the DC power and over current detection of the AC power and temperature detection of the upper and lower arms; and a second abnormality detection unit that detects the abnormality of the inverter unit by detecting abnormality of each of the plurality of semiconductor switching elements constituting the upper arm and the plurality of semiconductor switching elements constituting the lower arm, wherein the driving control unit includes a first protection circuit unit that performs a protection operation when the first abnormality detection unit detects the abnormality of the inverter unit, and a second protection circuit unit that performs the protection operation when the second abnormality detection unit detects the abnormality of the inverter unit.

According to a second aspect of the present invention, in the power converter according to the first aspect, the driving control unit further includes a high-order control unit and a control unit that generates the switching control signal based on a signal from the high-order control unit, wherein the first protection circuit unit includes first, second, and third protection circuits, wherein the second protection circuit unit includes a fourth protection circuit, and wherein the first to fourth protection circuits are arranged in order between the control unit and the gate driving unit.

According to a third aspect of the present invention, in the power converter according to the second aspect, the first abnormality detection unit includes an over voltage detection unit that detects an over voltage between positive and negative electrodes of the inverter unit and inputs an over voltage detection signal to the driving control unit, an over current detection unit that detects an over current of AC power output of the inverter unit and inputs an over current detection signal to the driving control unit, and a temperature detection unit that detects temperatures of the upper and lower arms and inputs a temperature detection signal to the driving control unit.

According to a fourth aspect of the present invention, in the power converter according to the third aspect, the first protection circuit unit controls the first to third protection circuits and controls an input of the gate signal to the inverter unit by outputting a first control signal, a second control signal, and a third control signal to the first protection circuit, the second protection circuit, and the third protection circuit, respectively, based on the over voltage detection signal, the over current detection signal, the temperature detection signal, a signal input from the high-order control unit and used to turn off all of the plurality of semiconductor switching elements constituting the upper and lower arms, and a signal input from the high-order control unit and used to turn on all of the plurality of semiconductor switching elements constituting the upper arm or a signal input from the high-order control unit and used to turn on all of the plurality of semiconductor switching elements constituting the lower arm.

According to a fifth aspect of the present invention, in the power converter according to the fourth aspect, by delaying rising timings of the second and third control signals by a first predetermined time than a rising timing of the first control signal and delaying a falling timing of the first control signal by a second predetermined time than a falling timing than falling timings of the second and third control signals, the semiconductor switching elements of the upper arm and the semiconductor switching elements of the lower arm connected in series to the semiconductor switching elements of the upper arm are not simultaneously turned on.

According to a sixth aspect of the present invention, in the power converter according to the fourth aspect, the first protection circuit unit includes a protection logic circuit, when the first control signal (High) is input to the first protection circuit, the first protection circuit outputs the first control signal (High) to the second and third protection circuits, instead of the switching control signal from the control unit, when the second control signal (High) is input to the second protection circuit, a signal (Low) inverted from the second control signal (High) is output to the fourth protection circuit, instead of an output signal from the first protection circuit, so that only the plurality of semiconductor switching elements of the upper arm are turned on, when the third control signal (High) is input to the third protection circuit, a signal (Low) inverted from the third control signal (High) is output to the fourth protection circuit, instead of the output signal from the first protection circuit, so that only the plurality of semiconductor switching elements of the lower arm are turned on, and the protection logic circuit outputs the second control signal and the third control signal based on the over voltage detection signal, the over current detection signal, the temperature detection signal, the signal input from the high-order control unit and used to turn off all of the plurality of semiconductor switching elements constituting the upper and lower arms, and the signal input from the high-order control unit and used to turn on all of the plurality of semiconductor switching elements constituting the upper arm or the signal input from the high-order control unit and used to turn on all of the plurality of semiconductor switching elements constituting the lower arm.

According to a seventh aspect of the present invention, in the power converter according to the sixth aspect, the protection logic circuit includes a timer circuit and a 3 phase short logic circuit, the 3 phase short logic circuit includes a first delay circuit that delays a rising timing of the second control signal by a first predetermined time and delays a falling timing of the second control signal by a third predetermined time, and a second delay circuit that delays a rising timing of the third control signal by the first predetermined time and delays a falling timing of the second control signal by a third predetermined time shorter than the first predetermined time, and the timer circuits delays a falling timing of the first control signal by a second predetermined time, so that the semiconductor switching elements of the upper arm and the semiconductor switching elements of the lower arm connected in series to the semiconductor switching elements of the upper arm are not simultaneously turned on.

According to an eighth aspect of the present invention, in the power converter according to the second aspect, the second abnormality detection unit inputs a semiconductor switching element abnormality detection signal to the driving control unit, when detecting abnormality of each of the plurality of semiconductor switching elements constituting the upper arm and the plurality of semiconductor switching elements constituting the lower arm, and the second protection circuit unit inputs the semiconductor switching element abnormality detection signal to the fourth protection circuit as a fourth control signal (High) to the fourth protection circuit to control an input of the gate signal to the inverter unit so that all of the semiconductor switching elements of the upper and lower arms are turned off.

According to a ninth aspect of the present invention, in the power converter according to the fourth or fifth aspect, when the over voltage detection signal is input to the first protection circuit unit, the first protection circuit unit controls the input of the gate signal to the inverter unit such that all of the plurality of semiconductor switching elements of the upper arm are turned on and all of the plurality of semiconductor switching elements of the lower arm are turned off, or all of the semiconductor switching elements of the upper arm are turned off and all of the semiconductor switching elements of the lower arm are turned on.

According to a tenth aspect of the present invention, in the power converter according to the sixth or seventh aspect, when the over voltage detection signal is input to the first protection circuit unit, the protection logic circuit inputs the first control signal to the first protection circuit and the protection logic circuit inputs the second control signal to the second protection circuit to control the input of the gate signal to the inverter unit so that all of the plurality of semiconductor switching elements of the upper arm are turned on, or the protection logic circuit inputs the third control signal to the third protection circuit to control the input of the gate signal to the inverter unit so that all of the plurality of semiconductor switching elements of the lower arm are turned on.

According to an eleventh aspect of the present invention, in the power converter according to the fourth or fifth aspect, when the over current detection signal is input to the first protection circuit unit, the first protection circuit unit controls the input of the gate signal to the inverter unit so that all of the plurality of semiconductor switching elements of the upper arm are turned on and all of the plurality of semiconductor switching elements of the lower arm are turned off, or all of the plurality of semiconductor switching elements of the upper arm are turned off and all of the semiconductor switching elements of the lower arm are turned on.

According to a twelfth aspect of the present invention, in the power converter according to the sixth or seventh aspect, when the over current detection signal is input to the first protection circuit unit, the protection logic circuit inputs the first control signal to the first protection circuit and the protection logic circuit inputs the second control signal to the second protection circuit to control the input of the gate signal to the inverter unit so that all of the plurality of semiconductor switching elements of the upper arm are turned on, or the protection logic circuit inputs the third control signal to the third protection circuit to control the input of the gate signal to the inverter unit so that all of the plurality of semiconductor switching elements of the lower arm are turned on.

According to a thirteenth aspect of the present invention, in the power converter according to the fourth or fifth aspect, when a signal used to turn on all of the plurality of semiconductor switching elements constituting the upper arm is input from the high-order control unit to the first protection circuit unit, the first protection circuit unit controls the input of the gate signal to the inverter unit so that all of the plurality of semiconductor switching elements of the upper arm are turned on and all of the plurality of semiconductor switching elements of the lower arm are turned off.

According to a fourteenth aspect of the present invention, in the power converter according to the sixth or seventh aspect, when a signal used to turn on all of the plurality of semiconductor switching elements constituting the upper arm is input from the high-order control unit to the first protection circuit unit, the protection logic circuit inputs the first control signal to the first protection circuit and inputs the second control signal to the second protection circuit to control the input of the gate signal to the inverter unit so that all of the plurality of semiconductor switching elements of the upper arm are turned on.

According to a fifteenth aspect of the present invention, in the power converter according to the fourth or fifth aspect, when a signal used to turn on all of the plurality of semiconductor switching elements constituting the lower arm is input from the high-order control unit, the first protection circuit unit controls the input of the gate signal to the inverter unit so that all of the plurality of semiconductor switching elements of the lower arm are turned on and all of the plurality of semiconductor switching elements of the upper arm are turned off.

According to a sixteenth aspect of the present invention, in the power converter according to the sixth or seventh aspect, when a signal used to turn on all of the plurality of semiconductor switching elements constituting the lower arm is input from the high-order control unit to the first protection circuit unit, the protection logic circuit controls the input of the gate signal to the inverter unit so that the first control signal is input to the first protection circuit and the third control signal is input to the third protection circuit to turn on all of the plurality of semiconductor switching elements of the lower arm.

According to a seventeenth aspect of the present invention, in the power converter according to the fourth or fifth aspect, when a signal used to turn off all of the plurality of semiconductor switching elements constituting the upper and lower arms is input from the high-order control unit to the first protection circuit unit, the first protection circuit unit controls the input of the gate signal to the inverter unit so that all of the plurality of semiconductor switching elements of the upper and lower arms are turned off.

According to an eighteenth aspect of the present invention, in the power converter according to the sixth or seventh aspect, when a signal used to turn off all of the plurality of semiconductor switching elements constituting the upper and lower arms is input from the high-order control unit to the first protection circuit unit, the protection logic circuit inputs the first control signal to the first protection circuit to control the input of the gate signal to the inverter unit so that all of the plurality of semiconductor switching elements of the upper and lower arms are turned off.

According to a nineteenth aspect of the present invention, in the power converter according to any one of the second to eighteenth aspects, each of the first to fourth protection circuits includes a 3-state buffer.

According to a twentieth aspect of the present invention, in the power converter according to the seventh aspect, the 3 phase short driving signal control logic outputs one of the second and third control signals based on the over voltage detection signal, the over current detection signal, the temperature detection signal, and a signal input from the high-order control unit and used to turn on all of the plurality of semiconductor switching elements constituting the upper arm or a signal input from the high-order control unit and used to turn on all of the plurality of semiconductor switching elements constituting the lower arm.

According to a twenty-first aspect of the present invention, in the power converter according to the sixth or seventh aspect, the protection logic circuit further includes an invalidation logic, and under the control of the control unit, the invalidation logic cuts of the signal output from the high-order control unit and used to turn on all of the plurality of semiconductor switching elements constituting the upper arm, and the signal output from the high-order control unit and used to turn on all of the plurality of semiconductor switching elements constituting the upper arm or the signal output from the high-order control unit and used to turn on all of the plurality of semiconductor switching elements constituting the lower arm.

According to a twenty-second aspect of the present invention, in the power converter according to the eighth aspect, when an output of the second abnormality detection unit is cut off, the second protection circuit unit inputs the fourth control signal (High) to the fourth protection circuit to control the input of the gate signal to the inverter unit so that all of the plurality of semiconductor switching elements of the upper and lower arms are turned off.

According to a twenty-third aspect of the present invention, in the power converter according to the fifth or seventh aspect, the first predetermined time is equal to or greater than a switching time in which the semiconductor switching elements used as the plurality of semiconductor switching elements constituting the upper and lower arms are changed over from ON to OFF.

Advantageous Effects of Invention

The power converter including the protection circuit according to the invention is capable of quickly performing an optimum protection control operation of the system including the power converter with high safety according to a failure situation of the power converter.

BRIEF DESCRIPTION OF DRAWINGS

FIG. 8 is a diagram illustrating an operation state of the protection circuit, when a control operation of causing a semiconductor switching element of an inverter unit 103 to become 3 phase open or 3 phase short at the time of detection of a failure in the power converter including the protection circuit unit 110 in FIG. 2.

FIG. 9 is, a detection order flowchart illustrating precedence of triggers of the operation of the protection circuit unit performing the 3 phase open or the 3 phase short illustrated in FIG. 8.

DESCRIPTION OF EMBODIMENTS

Hereinafter, an embodiment of the present invention will be described with reference to FIGS. 1 to 9 giving an example in which the invention is applied to a hybrid vehicle electrical motor driving device.

Figure 1:
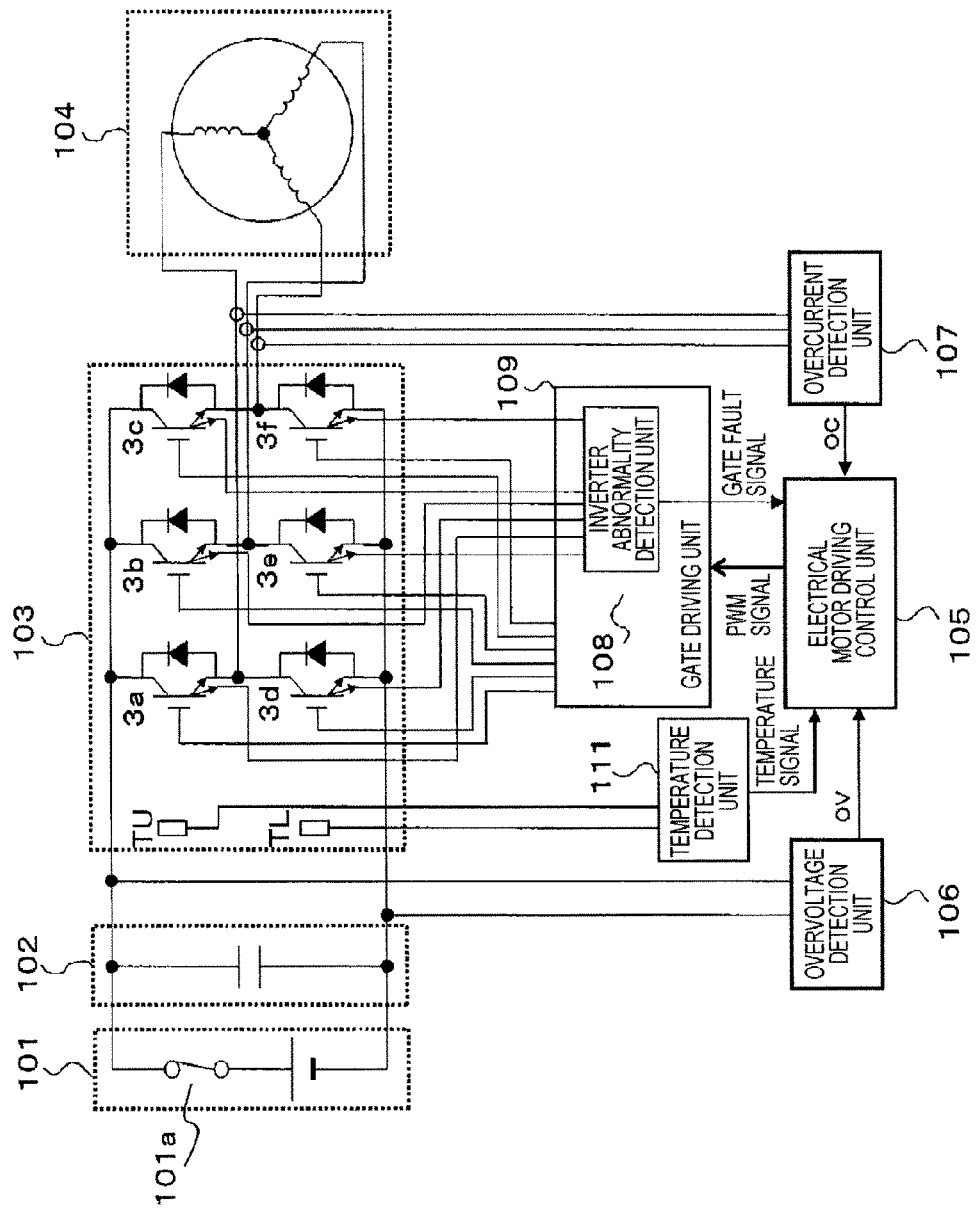
FIG. 1 is a block diagram illustrating an overview of a power conversion circuit according to an embodiment, when the invention is applied to a hybrid vehicle electrical motor driving device.

FIG. 1 is a diagram illustrating an example of a power conversion circuit when the invention is applied to the hybrid vehicle electrical motor driving device. In FIG. 1, reference numeral 101 denotes a DC power source, reference numeral 102 denotes a smoothing capacitor, reference numeral 103 denotes an inverter unit, reference numeral 104 denotes an electrical motor, reference numeral 105 denotes an electrical motor driving control unit, reference numeral 106 denotes an over voltage detection unit, reference numeral 107 denotes an over current detection unit, reference numeral 108 denotes an inverter abnormality detection unit, reference numeral 109 denotes a gate driving unit, and reference numeral 111 denotes a temperature detection unit. The smoothing capacitor 102 is connected in parallel to the DC power source 101. The DC power source 101 is provided with a contactor 101a.

The inverter unit 103 has a configuration of a 3 phase full-bridge in which semiconductor switching elements 3a to 3f are connected to each other. IGBTs are used in the switching elements 3a to 3f of the inverter unit according to this embodiment, and a reflux diode installed in parallel in each IGBT is used. The over voltage detection unit 106 measures a voltage between a positive-side line and a negative-side line of the DC power source 101. When the over voltage detection unit 106 detects an over voltage, the over voltage detection unit 106 outputs an over voltage detection signal OV to the electrical motor driving control unit 105 which is a driving control unit of the electrical motor 104. The over current detection unit 107 measures each line current of the electrical motor 104. When the over current detection unit 107 detects an over current, the over current detection unit 107 outputs an over current detection signal OC to the electrical motor driving control unit 105.

When the inverter abnormality detection unit 108 detects abnormality of the electrical motor 104, the semiconductor switching element, or the inverter unit 103, the inverter abnormality detection unit 108 outputs a gate fault signal which is an inverter abnormality detection signal to the electrical motor driving control unit 105. The inverter abnormality detection unit 108 detects the abnormality, for example, when detecting a short-circuit current of the IGBTs used as the semiconductor switching element 3a to 3f or when a gate driving power source voltage of the IGBT is less than a threshold value.

As a method of detecting the short-circuit current of the IGBT, for example, a method of using a current mirror IGBT or a method of monitoring a voltage between a collector and an emitter of the IGBT can be used. Here, the method of detecting the short-circuit current is not particularly limited. For example, a short-circuit current detection threshold value of the IGBT is set such that the operation is performed when a current equal to or greater than the double of a threshold value of the over current detection unit 107 flows for a few of µs. The decrease in the gate driving power source voltage causes an increase in the voltage between the collector and the emitter, thereby increasing heat generation of a chip. Accordingly, the detection threshold value is set to have a value so that the temperature of the chip does not exceed a heat rating. An operation performed when abnormality of the inverter unit 103 is detected and the gate fault signal is output will be described below.

The temperature detection unit 111 detects the temperature of the upper arm, that is, the semiconductor switching elements of the upper arm and the temperature of the lower arm, that is, the semiconductor switching elements of the lower arm by outputs of a temperature sensor TU detecting the temperature of the upper arm and a temperature sensor TL detecting the temperature of the lower arm. The detected temperatures of the upper and lower arms are input to an electrical motor control microcomputer 206 and are used for control of the power converter.

Further, the temperature detection unit 111 compares the detected temperatures of the upper and lower arms to each other. An upper arm temperature signal and a lower arm temperature signal indicating the results are input to a 3 phase short driving signal logic 204. When the temperature of the upper arm is higher, the upper arm temperature signal is set to be High and the lower arm temperature signal is set to be Low. Conversely, when the temperature of the lower arm is high, the upper arm temperature signal is set to be Low and the lower arm temperature signal is set to be High.

The gate driving unit 109 outputs a gate driving signal according to a switching control signal from the electrical motor control microcomputer 206 (see FIG. 2) of the electrical motor driving control unit 105 to the semiconductor switching elements 3a to 3f installed in the inverter unit 103. At the time of normal driving, a PWM (Pulse Width Modulation) control signal output from the electrical motor control microcomputer is input as the switching control signal from the electrical motor driving control unit 105 to the gate driving unit 109 without change, and a gate signal based on the PWM control signal is input to the inverter unit 103. Thus, by switching the semiconductor switching elements 3a to 3f provided in the inverter unit 103 based on the PWM control signal, a DC voltage input from the DC power source 101 to the inverter unit 103 is converted into any 3 phase alternate-current (AC).

Figure 2:
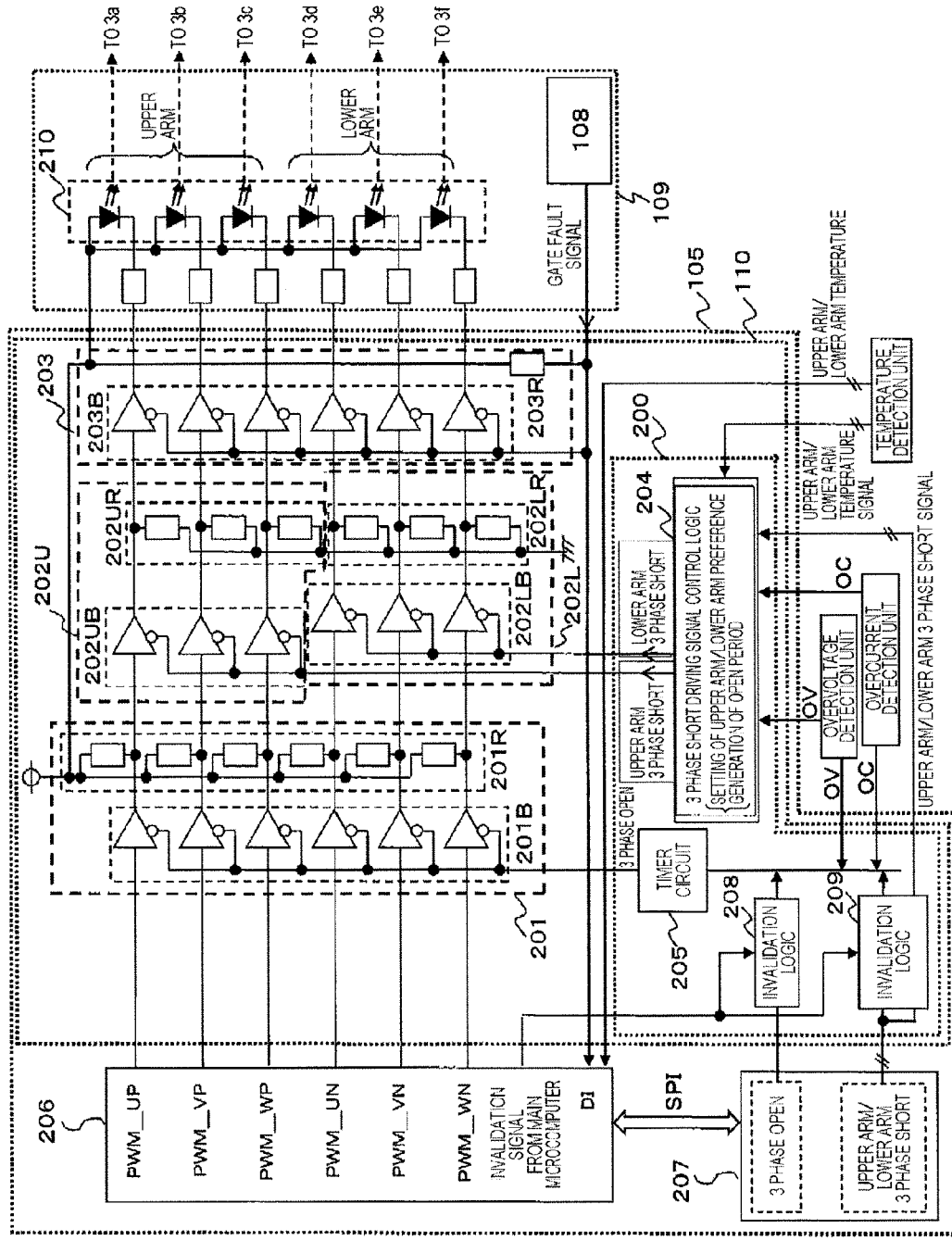
FIG. 2 is a block diagram illustrating an overview of an electrical motor driving control unit 105, an overview of a protection circuit unit 110, and an overview of a gate driving unit 109 in FIG. 1.

FIG. 2 is a block diagram illustrating the electrical motor driving control unit 105 and the gate driving unit 109 that drives the gates of the semiconductor switching elements of the inverter unit 103 in FIG. 1. The electrical motor driving control unit 105 includes an electrical motor control microcomputer 206 and a protection circuit unit 110. In the gate driving unit 109 in FIG. 2, a circuit (light-receiving element) subsequent to a light-emitting diode 210 of a opt-coupler and a predriver circuit outputting the gate signal are not illustrated.

In the embodiment of the invention, the electrical motor control microcomputer 206 provided in the electrical motor driving control unit 105 and a main microcomputer 207 which is a high-order control device of the electrical motor control microcomputer 206 are used. The electrical motor driving control unit 105 is normally controlled by the electrical motor control microcomputer 206. The electrical motor control microcomputer 206 calculates an appropriate switching time of the semiconductor switching element of the inverter unit 103 and performs PWM control to provide any torque or the number of rotations to the electrical motor. As a result, an AC voltage and an AC current are applied to each phase of the electrical motor 104 to control the driving. The protection function fulfilled by the main microcomputer 207 described in the embodiment of the invention may be also fulfilled by the electrical motor control microcomputer 206.

Abnormality of the electrical motor control microcomputer 206 may be a cause of an operation failure of the IGBT or the electrical motor 104 and may result in breakdown of the IGBT. Therefore, when the main microcomputer 207 detects the abnormality of the electrical motor control microcomputer 206, the main microcomputer 207 transmits a control signal as a trigger signal used to perform 3 phase open or 3 phase short to the protection circuit unit 110 without passing through the electrical motor control microcomputer 206 and performs the 3 phase short or the 3 phase open of the inverter unit 103 so that safety of a vehicle is ensured.

For example, by performing SPI (Serial Peripheral Interface) communication between the main microcomputer 207 and the electrical motor control microcomputer 206 and confirming consistency of a reply (for example, a reply to an arithmetic instruction of "1+1") to an arithmetic instruction from the main microcomputer 207 to the electrical motor control microcomputer 206, it is detected whether the electrical motor control microcomputer 206 is abnormal.

On switching control signal lines between the electrical motor control microcomputer 206 and the gate driving unit 109, a 3-state buffer 201B and a pull-up resistor 201R forming a first protection circuit 201 are installed, a 3-state buffer 202UB and a pull-down resistor 202UR forming a second protection circuit 202U are installed, a 3-state buffer 202LB and a pull-down resistor 202LR forming a third protection circuit 202L are installed, and a 3-state buffer 203B forming a fourth protection circuit 203 is further installed. The buffer 201B, the pull-up resistor 201R, and the buffer 203B are installed on all of the switching control signal lines of the semiconductor switching elements $3a$ to $3f$ forming the upper and lower arms. The buffer 202UB and the pull-down resistor 202UR are installed on the switching control signal lines of the semiconductor switching elements $3a$, $3b$, and $3c$ forming the upper arm. The buffer 202LB and the pull-down resistor 202LR are installed on the switching control signal lines of the semiconductor switching elements $3d$, $3e$, and $3f$ forming the lower arm.

The protection circuit unit 110 is configured to include the first to fourth protection circuits 201, 202U, 202L, and 203 and a protection logical circuit 200 that controls the first to third protection circuits 201, 202U, and 202L. The protection logical circuit 200 is further configured to include a 3 phase short driving signal control logic 204, a timer circuit 205, invalidation logics 208 and 209. The fourth protection circuit is controlled by an inverter abnormality detection signal (gate fault signal) from the inverter abnormality detection unit 108.

In the invention, supply/cutoff of the switching signal from the electrical motor control microcomputer 206 to the gate driving unit 109 is controlled by the first to fourth protection circuits 201, 202U, 202L, and 203. When the switching control signal from the electrical motor control microcomputer 206 is cut off, instead of the switching control signal, an output signal from each protection circuit is input as a switching control signal to the gate driving unit 109.

Trigger signals based on various kinds of abnormality occurring inside the power conversion circuit in addition to abnormality of the electrical motor control microcomputer 206 are input as control signals to buffers of the first to fourth protection circuits 201, 202U, 202L, and 203.

When no abnormality occurs in the power converter and no trigger signal based on abnormality is thus generated, the switching control signals output from the electrical motor control microcomputer 206 and used to perform switching driving of the semiconductor switching elements $3a$ to $3f$ pass through the buffers 201B, 202UB, 202LB, and 203B without change and are input to the gate driving unit 109.

On the other hand, when the control signals (trigger signals) are input to the buffers 201B, 202UB, 202LB, and 203B, the buffers each enter a cutoff state (high-impedance state). When the trigger signal is input to the buffer 201B and the output side of the buffer 201B enters the cutoff state, the input sides of the buffers 202UB and 202LB are pulled up to the High state by the connected pull-up resistor 201R. Therefore, High signals are input to the buffers 202UB and 202LB.

When the trigger signals are input to the buffers 202UB and 202LB, the output sides of the buffers 202UB and 202LB are cut off and the input side of the buffer 203B is pulled down to the Low state by the respectively connected pull-down resistors 202UR and 202LR. Therefore, a Low signal is input to the buffer 203B.

When the trigger signal is input to the buffer 203B, the output side (that is, the input side of the gate driving unit 109) of the buffer 203B enters the high-impedance state. Therefore, since no current flows to the light-emitting diode 208 of the opt-coupler inside the gate driving unit 109, an optical signal is not output and the gate signals used to drive the switching elements $3a$ to $3f$ are not output from the gate driving unit 109. That is, the switching elements $3a$ to $3f$ are turned off. Even when the output of the buffer 203B becomes High due to the inputs from the buffers 202UB and 202LB, no current flows to the light-emitting diode 210 of the opt-coupler. Therefore, an optical signal is not output and the semiconductor switching elements $3a$ to $3f$ are turned off.

Thus, when the Low signal is input from the buffer 203B in the gate driving circuit 109, the optical signal is output from the light-emitting diode 210 and the gate driving signal used to turn on the semiconductor switching element (conductive state) is output. Conversely, when the High signal is input, the gate driving signal used to turn off the semiconductor switching element (cutoff state) is output. In this embodiment, by controlling the buffer outputs of the buffers 201B, 202UB, 202LB, and 203B as a protection operation at the time of abnormality of the power converter, a 3 phase open operation of turning off all of the semiconductor switching elements $3a$ to $3f$ is performed or a 3 phase short (upper arm 3 phase short or lower arm 3 phase short) operation of turning on only the semiconductor switching elements $3a$ to $3c$ of the upper arm or the semiconductor switching elements ($3d$ to $3f$) of the lower arm and turning off the other semiconductor switching elements is performed.

When the 3 phase short is performed, a back EMF (electromotive force) is generated in a coil of the electrical motor 104 due to self-induction and a braking effect caused due to the back EMF occurs. By stopping a vehicle quickly or driving a vehicle at a low speed using the braking effect, safety of the vehicle can be ensured when abnormality occurs in the power converter.

(3 Phase Open Operation)

The 3 phase open operation is performed by a 3 phase open trigger signal from the main microcomputer 207 or the inverter abnormality detection signal (gate fault signal) from the inverter abnormality detection unit 108, which is a trigger signal generated when the inverter abnormality detection unit 108 detects abnormality of the inverter unit 103. The 3 phase open operation performed by the gate fault signal will be described below.

The 3 phase open trigger signal from the main microcomputer 207 is generated in various cases in which the main microcomputer 207 monitors an operation state (including abnormality) of the power converter and it is determined that the 3 phase open is necessary. Each case will be described in detail below.

When the 3 phase open trigger signal from the main microcomputer 207 is input to the protection logic circuit 200, the 3 phase open trigger signal is input to the buffer 201B via the timer circuit 205. When the 3 phase open trigger signal is input as a control (trigger) signal to the buffer 201B, as described above, the buffer 201B enters the cutoff state and the output side of the buffer 201B is also pulled up and enters the High state. On the other hand, when the control signals are not input to the buffers 202UB, 202LB, and 203B, all of these buffers are in the conductive state and the signals input to these buffers are output directly without change of the High or Low state. That is, in the 3 phase open operation when the 3 phase open trigger signal is input from the main microcomputer 207, the High signals are input to the gate driving unit 109 in regard to all of the semiconductor switching elements 3a to 3f of the upper and lower arms. As a result, the gate signals used to drive the semiconductor switching elements are not output from the gate driving unit and all of the semiconductor switching elements 3a to 3f are in the cutoff state. As described above, when the High signal is input to the gate driving unit 109, the gate signals used to drive the semiconductor switching elements are not output to the inverter unit and the semiconductor switching elements are turned off (enter the cutoff state). When the Low signal is input to the gate driving unit 109, the semiconductor switching elements are turned on (enter the conductive state).

When the input of the 3 phase open trigger signal from the main microcomputer 207 is not performed, the input of the 3 phase open trigger signal is retained in the buffer 201B only for a time ($\Delta t2$ illustrated in FIG. 3) set by the timer circuit 205, and then the input of the 3 phase open signal to the buffer 201B is not performed (the Low state is entered). That is, the 3 phase open trigger signal to the buffer 201B is delayed only for the delay time $\Delta t2$ generated by the timer circuit 205 operating from the falling edge of this 3 phase open trigger signal, and thus the trigger signal enters the Low state. When the input of the 3 phase open signal to the buffer 201B is not performed, the buffer 201B enters the conductive state. Therefore, the switching signal from the electrical motor control microcomputer 206 passes through the buffers 201B, 202UB, 202LB, and 203B and is supplied to the gate driving unit 109, and thus the normal PWM control is recovered.

By setting the switching control signals of the semiconductor switching elements output from the electrical motor control microcomputer 206 to be High, the 3 phase open operation of the semiconductor switching elements can be also performed. In this case, the 3 phase open operation is performed when the 3 phase open is performed as a part of the normal PWM control and when the 3 phase open is performed by an input of the 3 phase open trigger signal generated by the main microcomputer 207 or a trigger signal (to be described below) generated due to another normal state to the gate driving unit 109 to further ensure the safety.

(3 Phase Short Operation)

Figure 3:
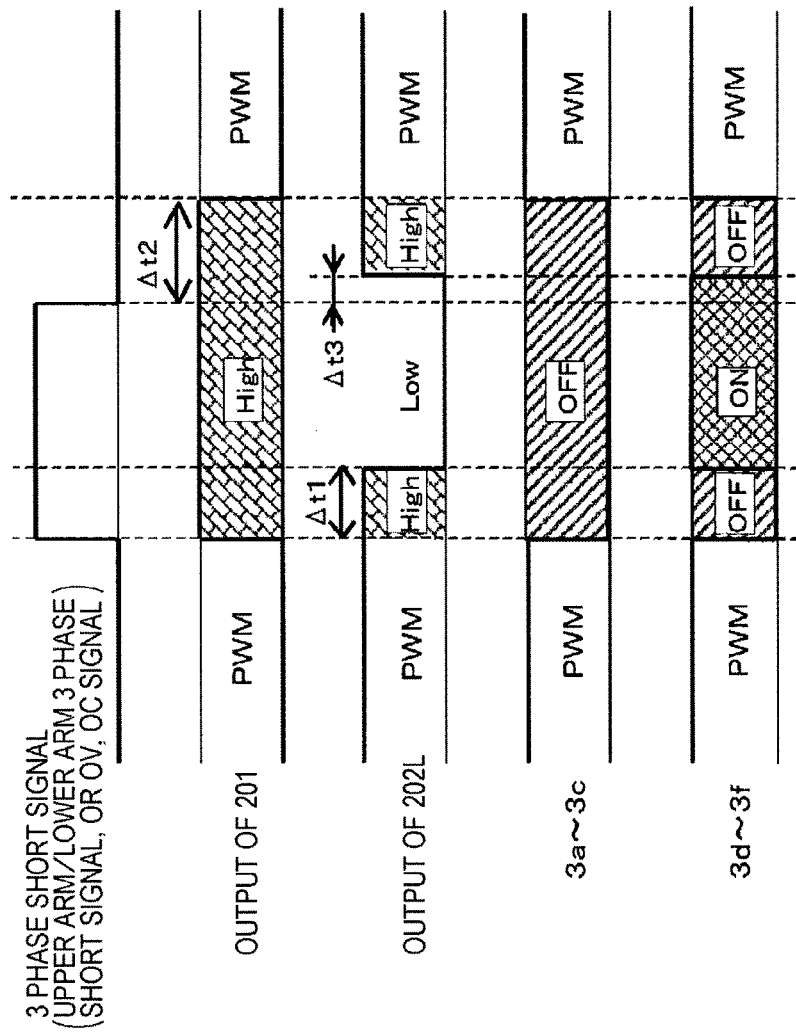
FIG. 3 is a signal timing diagram illustrating a 3 phase short operation of the protection circuit unit of the power converter in FIG. 2 according to the invention.

FIG. 3 is a diagram illustrating the 3 phase short operation of the protection circuit unit 110 of the power converter according to the invention. As described above, the 3 phase short operation includes the 3 phase short operation of the upper arm and the 3 phase short operation of the lower arm. Hereinafter, the 3 phase short operation of the lower arm will be described.

FIG. 3 illustrates a timing chart when the 3 phase short operation of the lower arm is performed. Further, a timing chart of the 3 phase short operation of the upper arm is the same as the lower arm 3 phase short operation illustrated in FIG. 3. $\Delta t1$ and $\Delta t3$ indicate delays of the falling edge and the rising edge of a lower arm 3 phase short signal (or an upper arm 3 phase short signal) output from the 3 phase short driving signal control logic 204, respectively, and are generated by a circuit inside the 3 phase short driving signal control logic 204 (to be described below). As described above, $\Delta t2$ is a delay generated by the timer circuit 205.

The 3 phase short trigger signal from the main microcomputer 207 is generated in various cases in which the main microcomputer 207 monitors an operation state (including abnormality) of the power converter and a vehicle state and it is determined that the 3 phase short is necessary. Each case will be described in detail below.

A trigger signal (lower arm 3 phase short) used to perform the 3 phase short is input from the main microcomputer 207 to the buffer 201B and the 3 phase short driving signal control logic 204. In this case, the trigger signal input to the buffer 201B is substantially the same as the above-described 3 phase open trigger signal used to cut off all of the buffers 201B, and an output of the buffer 201B is cut off. As a result, the input sides of the buffer 202UB and the buffer 202LB provided in the rear stage of the buffer 201B are pulled up to the High state.

At this time, as described above, to further improve the safety of the operation, the switching control signals from the electrical motor control microcomputer 206 may be set to be High so that the semiconductor switching elements perform the 3 phase open operation. Since the SPI connection is made between the main microcomputer 207 and the electrical motor control microcomputer 206, the gate control is performed by an instruction of the main microcomputer 207. In this case, not the PWM signal normally output from the electrical motor control microcomputer 206 but a signal with the High state is output as the switching control signal from the electrical motor control microcomputer 206.

The reason for performing such control is that one side of the upper arm side semiconductor switching elements 3a to 3c and the lower arm side semiconductor switching elements 3d to 3f in the inverter unit 103 enters the conductive (ON) state and the other side thereof has to already enter the non-conductive (OFF) state, when the 3 phase short is performed. When all of the semiconductor switching elements of the upper and lower arms are turned on, a high current continuously flows to the semiconductor switching elements by forming a short-circuit for the DC power source 101, thereby causing breakdown.

As described above, when the Low signal is input to the gate driving unit 109, the semiconductor switching elements are turned on. When the High signal is input, the semiconductor switching elements are turned off. Therefore, when the trigger signal (a signal which is substantially the same as the 3 phase open trigger signal in this case) used to perform the 3 phase short is input to the buffer 201B, as described above, the input sides (the output side of the buffer 201B) of the buffers 202UB and 202LB enter the High state. Further, since the High signal input to the buffer 202UB passes through the buffer 203B and is input directly to the gate driving unit 109, the semiconductor switching elements 3a to 3c are turned off.

On the other hand, the trigger signal used to perform the 3 phase short is input to the buffer 202LB via the 3 phase short driving signal control logic 204 to cut off the output of the buffer 202LB. When the output of the buffer 202LB is cut off, the output side of the buffer 202LB is pulled down to the Low state. As a result, in regard to the semiconductor switching elements 3d to 3f of the lower arm, the Low signal is input to the gate driving unit 109 and the semiconductor switching elements 3d to 3f are turned on. Thus, according to this embodiment, in the 3 phase short operation, the 3 phase open operation of turning off all of the semiconductor switching elements 3a to 3f is first performed, and the semiconductor switching elements 3a to 3c or the semiconductor switching elements 3d to 3f are subsequently turned on.

At this time, the trigger signal input to the buffer 202LB and used to perform the 3 phase short is delayed by Δt1 by the 3 phase short driving signal control logic 204, before the trigger signal is input to the buffer 202LB, as will be described below. That is, the trigger signal (in the case of the lower arm 3 phase short operation) is output which is delayed by the predetermined delay time Δt1 than the cutoff of the output of the buffer 201B and is used to perform the 3 phase short. As a result, the outputs of the buffer 201B are first cut off, the trigger signal is further delayed by the predetermined delay time Δt1, and the output side of the buffer 202LB enters the Low state.

When the trigger signal used to perform the 3 phase short disappears, that is, the trigger signal enters the Low state, a timing at which the trigger signal enters the Low state is delayed by Δt3 (Δt3<<Δt1) by the 3 phase short driving signal control logic 204. Therefore, the buffer 202LB (the buffer 202UB in the case of the upper arm 3 phase short operation) returns to the conductive state later by Δt3. At this time, as described above, the output side of the buffer 201B is delayed by Δt2 and enters the Low state from the High state, the trigger signal used to perform the 3 phase short becomes the Low state, the semiconductor switching elements 3d to 3f are also turned off after Δt3, and thus the state is changed to the 3 phase open state. After the cutoff of the output of the buffer 201B is maintained by the delay time Δt2 set by the timer circuit 205, the buffer 201B returns to the conductive state. Therefore, the trigger signal used to perform the 3 phase short becomes the Low state, and then the normal PWM control is recovered after the elapse of Δt2. That is, after the 3 phase short signal disappears, the 3 phase open state is entered and the normal PWM control is then recovered. Setting of Δt1 and Δt3 will be described below.

In this embodiment, as described above, to control the 3 phase short operation, the period in which the 3 phase open is performed is provided before and after the period in which the semiconductor switching elements are actually set for the 3 phase short.

The IGBT used as the semiconductor switching elements in the inverter unit has a dead time unique to the IGBT at the time of switching, that is, the period in which the gate signal enters an unstable state when the gate signal is changed from High to Low or from Low to High. Therefore, when the 3 phase short control is performed, as described above, the gate signals of the semiconductor switching elements are set to the Low state so that the semiconductor switching elements of the upper and lower arms enter the open state only for a time longer than the dead time of the IGBT. Accordingly, since the short-circuit of the semiconductor switching elements of the upper and lower arms can be prevented from occurring, the configuration with high safety can be realized.

For example, a raging value of the dead time of the IGBT used in the semiconductor switching elements 3a to 3f is 5 the 3 phase open periods (Δt1 and Δt2) before and after the 3 phase short period are ensured to have 5 μs or more at least, thereby reliably preventing the upper and lower short-circuit from occurring. Normally, since the rise of the switching (gate signal) is slightly longer than the fall, the dead time of the IGBT is set so that "Δt2>Δt1" is satisfied.

By configuring the series of the protection logic or the timer circuit 205 and the 3 phase short driving signal control logic 204 by hardware circuits, the cost can be reduced compared to a configuration in which a microcomputer and software are used. Further, even when the microcomputer is abnormal or a software bug occurs, the protection operation can be performed while ensuring the sufficient 3 phase open period. Therefore, the 3 phase short operation can be performed, while ensuring the sufficient safety.

Figure 4:
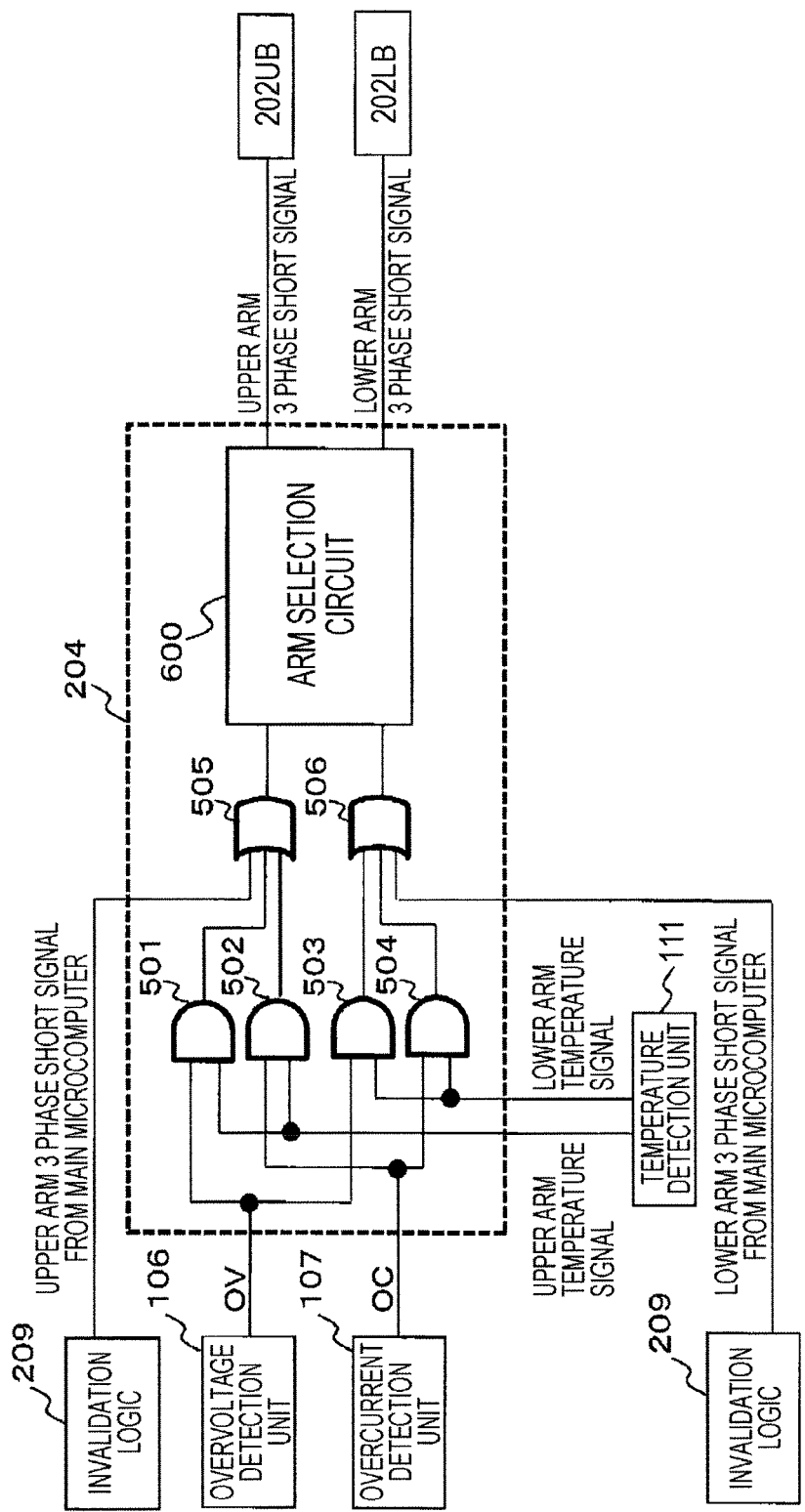
FIG. 4 is a block diagram illustrating an overview of a circuit of a 3 phase short driving signal control logic 204 in FIG. 2 according to the embodiment.
Figure 5:
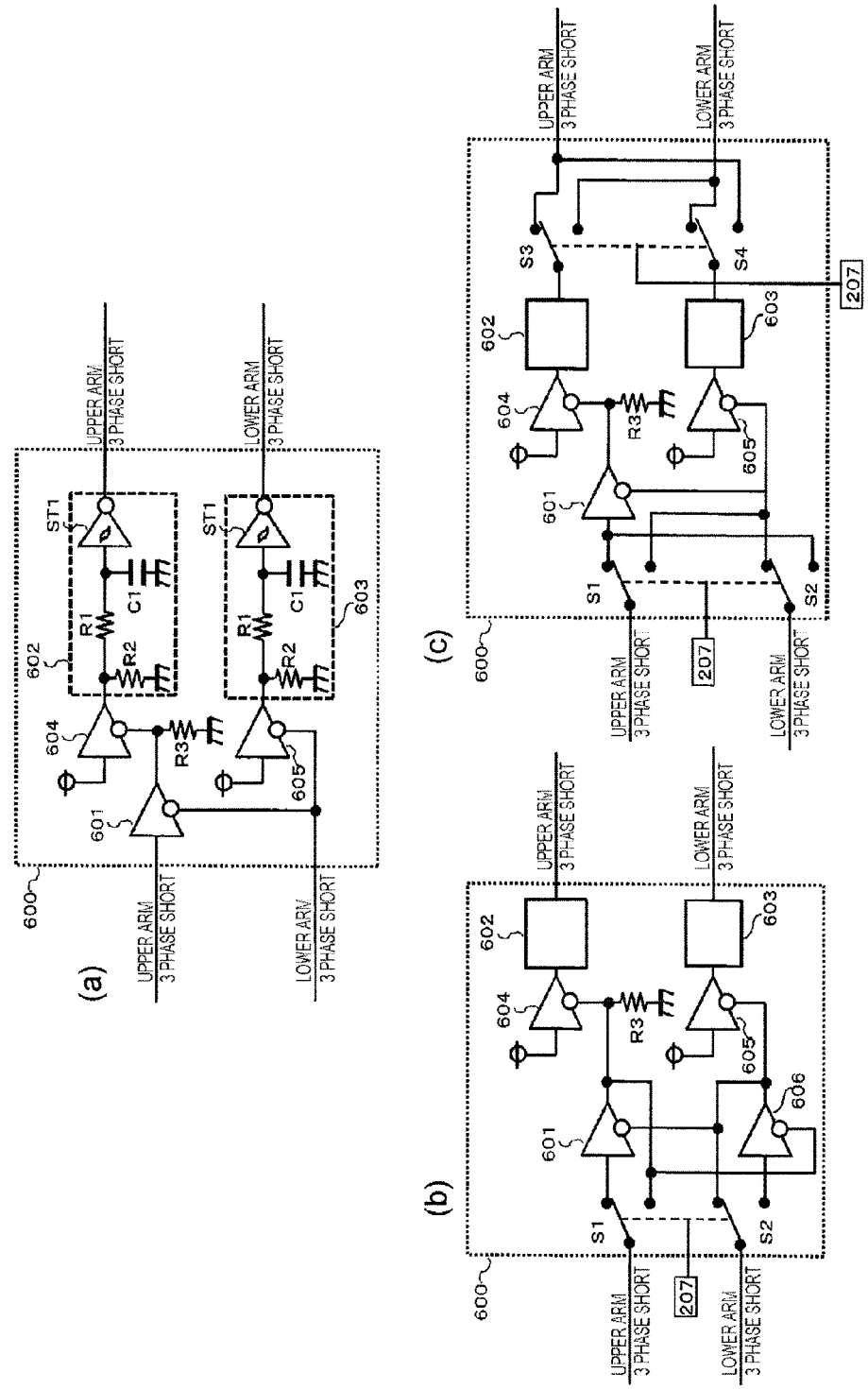
FIG. 5(a) is a diagram illustrating a circuit of an arm selection circuit 600 according to the embodiment in FIG. 4, and FIGS. 5(b) and 5(c) are diagrams illustrating modification examples of the embodiment of FIG. 5(a).

FIG. 4 is a block diagram illustrating an overview of the 3 phase short driving signal control logic 204.

A plurality of trigger signals (control signals) performing the 3 phase short (upper 3 phase short or lower 3 phase short) are input to the 3 phase short driving signal control logic 204. As the trigger signals, the upper arm 3 phase short signal, the over voltage detection signal OV, and the over current detection signal OC from the main microcomputer 207 are input. The upper arm temperature signal and the lower arm temperature signal from the temperature detection unit are input to the 3 phase short driving signal control logic 204.

The over voltage detection signal OV is input to AND circuits 501 and the 503, the upper arm temperature signal is input also to the AND circuit 501, and the lower arm temperature signal is input also to the AND circuit 503. Thus, when an over voltage is detected and an upper arm temperature is high, a signal used to perform the upper arm 3 phase short due to the over voltage is output to an OR circuit 505. Further, when a lower arm temperature is high, a signal used to perform the lower arm 3 phase short due to the over voltage is output to an OR circuit 506.

The over current detection signal OC is input to AND circuits 502 and 504, the upper arm temperature signal is input also to the AND circuit 502, and the lower arm temperature signal is input also to the AND circuit 504. Thus, when an over current is detected and the upper arm temperature is high, a signal used to perform the upper arm 3 phase short due to the over current is output to the OR circuit 505. Further, when the lower arm temperature is high, a signal used to perform the lower arm 3 phase short due to the over current is output to the OR circuit 506.

As described above, the upper arm 3 phase short signal from the main microcomputer 207, the upper arm 3 phase short signal generated due to the detection of the over voltage, and the upper arm 3 phase short signal generated due to the over current pass through the OR circuit 505. When any one of these signals enters the High state, the upper arm 3 phase short signal is input to an arm selection circuit 600.

Further, the lower arm 3 phase short signal from the main microcomputer 207, the lower arm 3 phase short signal generated due to the detection of the over voltage, and the lower arm 3 phase short signal generated due to the over current pass through the OR circuit 506. When any one of these signals enters the High state, the lower arm 3 phase short signal is input to the arm selection circuit 600.

Even when abnormality occurs in the power converter in the operation of the electrical motor driving unit 105 including the protection logic circuit 200 described above, only one of the upper arm 3 phase short signal and the lower arm 3 phase short signal is normally input to the arm selection circuit.

However, there is a probability that the upper arm 3 phase short signal and the lower arm 3 phase short signal may simultaneously be generated due to abnormality of the main microcomputer 207 or abnormality of the temperature detection unit, and both the upper arm 3 phase short signal and the lower arm 3 phase short signal may be input to the arm selection circuit 600.

The arm selection circuit 600 is a circuit that selects one of the upper arm 3 phase short signal and the lower arm 3 phase short signal and outputs the selected signal to the buffer 202UB or the buffer 202LB, even when the upper arm 3 phase short signal and the lower arm 3 phase short signal are simultaneously generated due to some abnormality.

FIG. 5(a) is a diagram illustrating a circuit example of the arm selection circuit 600.

The arm selection circuit 600 includes a circuit that outputs the upper arm 3 phase short signal and a circuit that outputs the lower arm 3 phase short signal. The circuit that outputs the upper arm 3 phase short signal includes a 3-state buffer 604 and a delay circuit 602 that delays and forms a signal waveform. Likewise, the circuit that outputs the lower arm 3 phase short signal includes a 3-state buffer 605 and a delay circuit 603.

A signal supplied from the main microcomputer 207 and used to perform the upper arm 3 phase short, a signal used to perform the upper arm 3 phase short based on the over voltage detection signal, and the upper arm 3 phase short signal based on the over current detection signal are input to the 3-state buffer 601. Further, a signal supplied from the main microcomputer 207 and used to perform the lower arm 3 phase short, a signal used to perform the lower arm 3 phase short based on the over voltage detection signal, and the lower arm 3 phase short signal based on the over current detection signal are input to the 3-state buffer 605 and are input as control signals of the 3-state buffer 601.

In regard to the 3-state buffer 601, the output side of the 3-state buffer 601 has high impedance and the output is cut off, when the lower arm 3 phase short signal is input.

When the 3-state buffer 601 has the high impedance, the output side of the 3-state buffer 601 is pulled down to the Low state quickly by a pull-down resistor R3. Thus, even when a signal is slightly output from the 3-state buffer 601 due to a slight time difference between the upper arm 3 phase short signal and the lower arm 3 phase short signal, the upper arm 3 phase short signal is not output from the driving signal control logic 204.

Accordingly, when the upper arm 3 phase short signal and the lower arm 3 phase short signal are simultaneously input to the arm selection circuit 600, only the lower arm 3 phase short signal passes through the delay circuit 603 and is output as the control signal of the buffer 201B. The upper arm 3 phase short signal is not output. That is, the lower arm 3 phase short signal is preferentially output by the 3-state buffer 601.

Thus, even when the upper arm 3 phase short signal and the lower arm 3 phase short signal are simultaneously input to the driving signal control logic 204, the upper arm 3 phase short signal is not output from the driving signal control logic 204, thereby preventing the short-circuit of the semiconductor switching elements of the lower arm side and the upper arm side.

Thus, even when the upper arm 3 phase short signal used to cut off the output of the buffer 202UB and the lower arm 3 phase short signal used to cut off the output of the buffer 202LB are simultaneously output due to some abnormality, the priority between the upper arm 3 phase short signal and the lower arm 3 phase short signal is set (here, the lower arm 3 phase short signal is preferred) by using the arm selection circuit 600 illustrated in FIGS. 4 and 5(a) so that only the semiconductor switching elements of one of the upper and lower arms can be turned on. Therefore, the upper and lower short-circuit between the upper and lower arms can be configured not to occur.

The priority between the upper arm 3 phase short and the lower arm 3 phase short can be changed by slightly modifying the arm selection circuit 600.

FIG. 5(b) is a diagram illustrating a modification example of the arm selection circuit 600 in FIG. 5(a) in which the preference between the upper arm 3 phase short and the lower arm 3 phase short is changed. In FIG. 5(b), another 3-state buffer 606 and two changeover switches S1 and S2 are installed on the input side of the arm selection circuit illustrated in FIG. 5(a). When the main microcomputer 207 simultaneously changes over the switches S1 and S2, the priority between the upper arm 3 phase short signal and the lower arm 3 phase short signal can be changed easily.

FIG. 5(c) is a diagram illustrating another modification example in which the preference between the upper arm 3 phase short and the lower arm 3 phase short is changed. In FIG. 5(c), two switches S1 and S2 are installed on the input side of the arm selection circuit illustrated in FIG. 5(a) and two changeover switches S3 and S4 are installed on the output side. When the main microcomputer 207 simultaneously changes over the switches S1 to S4, the priority between the upper arm 3 phase short signal and the lower arm 3 phase short signal can be changed easily.

The changeover of the switches S1 to S4 by the main microcomputer 207 may be performed using the temperature sensors TU and TL (see FIG. 1) installed in the upper and lower arms of the inverter unit 103, respectively, based on the temperatures of the upper and lower arms detected by the temperature detection unit 111. The preference of the upper or lower arm with a higher temperature can be appropriately set to be higher by the changeover. When the temperature of one of the upper and lower arms easily increases, the priority of the arm in which the temperature easily increases can be set to be high, thereby preventing the temperature of only one of the upper and lower arms from increasing.

Although not illustrated in FIG. 2, the over voltage detection signal OV is input also to the electrical motor control microcomputer 206 and the main microcomputer 207. Therefore, when the over voltage detection signal OV is generated, the 3 phase short trigger signal may be output from the electrical motor control microcomputer 206 and/or the main microcomputer 207.

(Setting of Delays Δt1 and Δt3)

The delay circuits 602 and 603 each include resistors R1 and R2, a capacitor C1, and a negative logic Schmitt trigger ST1.

The upper arm 3 phase short signal output from the Schmitt trigger ST1 of the delay circuit 602 is output as a control input of the 3-state buffer 202UB. The lower arm 3 phase short signal output from the Schmitt trigger ST1 of the delay circuit 603 is output as a control input of the 3-state buffer 202LB.

The above-described delays Δt1 and Δt3 are delays caused due to weakness of the waveforms of R1, R2, and C1 of the delay circuits 602 and 603 in the negative logic Schmitt trigger circuits ST1. Accordingly, by adjusting planning constants of the resistors R1, the resistors R2, or the capacitors C1 installed in the circuits 602 and 603, Δt1 and Δt3 can be adjusted so as to be sufficiently longer than the dead time of the IGBT.

The above-described delay Δt1 in the case of the lower arm 3 phase short is delay of the rising waveform of the 3 phase short signal indicated in FIG. 3. In this case, since the 3-state buffer 605 in FIG. 5 has high impedance, the output of the 3-state buffer 605 is cut off. Therefore, the High state of the input side of the Schmitt trigger ST1 is attenuated to a time constant "τ1=(R1+R2)×C1" determined by R1, R2, and C1 of the circuit 603 and becomes the Low state. Here, R2 is a pull-down resistor and "R1<<R2" is satisfied.

The delay Δt3 is delay of a falling waveform of the 3 phase short signal indicated by FIG. 3. In this case, since the 3-state buffer 605 does not enter the high impedance state, the Low state of the input side of the Schmitt trigger ST1 is increased to a time constant "τ2=R1×C1" determined by the resistor R1 and the capacitor C1 and becomes the High state.

Accordingly, "τ2<<τ1" and "Δt3<<Δt1" are satisfied by a relation of "R1<<R2" and the signal timing illustrated in FIG. 3 is realized.

(Operation when Over Current is Detected)

When the protection circuit detects an over current, the protection circuit of the power converter according to the invention performs a protection operation of performing the above-described 3 phase short. When the 3 phase short is performed at the time of the detection of the over current, the upper arm 3 phase short or the lower arm 3 phase short described above is performed based on the over current detection signal from the over current detection unit 107 and the temperature of the upper or lower arm detected by the temperature detection unit 111 without depending on the main microcomputer, as described above. To facilitate the description, an example in which the lower arm 3 phase short is performed will be described below.

When inter-phase short-circuit or grounding fault of the electrical motor 104 or an operation failure of the microcomputer occurs, a large coil current may flow in some cases. Since an excessive coil current causes a damage of the electrical motor 104 or a cable or breakdown of the semiconductor switching elements 3*d* to 3*f*, it is necessary to detect the over current for protection. In the embodiment of the invention, as illustrated in FIG. 1, the over current detection unit 107 is provided. When the over current detection unit 107 detects an over current, as illustrated in FIG. 2, the over current detection unit 107 outputs an over current detection signal (OC signal) as a trigger (control) signal (3 phase short signal) used to perform the 3 phase short to the electrical motor driving control unit 105. As in the above-described operation of detecting an over voltage, the electrical motor driving control unit 105 inputs the trigger signal used to perform the 3 phase short to the 3-state buffer 201B via the timer circuit 205 and simultaneously inputs the trigger signal to the 3 phase short driving signal control logic 204, and then outputs the 3 phase short signal (the lower arm 3 phase short signal) which is delayed to the 3-state buffer 202LB so that the operation transitions to the 3 phase short operation after a 3 phase open operation period.

When the normal PWM operation of the inverter unit 103 transitions to the 3 phase short, the current is stabilized to a current determined by an induced voltage of the electrical motor and the impedance of the electrical motor in the 3 phase short operation except for a transitory current variation. Therefore, the 3 phase short is effective as the protection to suppress the over current. Since a current is generated according to the induced voltage of the electrical motor at the time of the 3 phase short operation, a brake torque corresponding to the current is generated in the electrical motor. The 3 phase short operation is performed by the electrical motor control microcomputer in some cases so that the brake torque can be obtained to ensure vehicle safety and perform a stable operation when some abnormality occurs in a vehicle. However, the 3 phase short operation can be applied as the over current protection, only when the current at the time of the 3 phase short operation falls within a range in which the IGBT or the electrical motor is not broken down, that is, the current is equal to or less than a continuous maximum current determined by the rating of the IGBT.

In the embodiment of the invention, as illustrated in FIGS. 1 and 2, the over current detection signal OC is configured to be input to the electrical motor driving control unit 105 to perform the 3 phase short operation. Although not illustrated in FIG. 2, the over current detection signal OC is input also to the electrical motor control microcomputer 206 and the main microcomputer 207. Therefore, when the over voltage detection signal OV is generated, the trigger signal of the 3 phase short may be output to electrical motor control microcomputer 206 and/or the main microcomputer 207.

(Protection Operation when Over Voltage is Detected)

The protection circuit of the power converter according to the invention performs the 3 phase short protection operation, even when an over voltage is detected in addition to the detection of an over current. When the 3 phase short is performed at the time of detection of an over voltage, the upper arm 3 phase short or the lower arm 3 phase short is performed, as described above, based on the over voltage detection signal from the over voltage detection unit 106 and the temperature of the upper or lower arm detected by the temperature detection unit 111 without depending on the main microcomputer 207, as in the detection of the over current. To facilitate the description, an example in which the lower arm 3 phase short is performed will be described below.

Hereinafter, an example will be described in which abnormality of an over voltage occurs in a hybrid vehicle electrical motor driving device including the power converter according to the invention, and a protection operation in this example will be described.

In a regenerative operation, so-called chopper control is performed such that the inverter unit 103 is controlled so that the voltage of a DC power source line is higher than the voltage of the DC power source 101 to charge the DC power source 101. At this time, when abnormality occurs in the DC power source line, for example, when the contactor 101*a* of the DC power source 101 is turned off, the smoothing capacitor 102 is charged quickly, and thus the voltage of the DC power source line increases.

When the electrical motor 104 rotates at high speed, the induced voltage of the electrical motor 104 increases. When the voltage of the inverter unit 103 exceeds the voltage of the DC power source, a current flows from the inverter unit 103 to the DC power source 101. Further, when abnormality occurs in the DC power source line, for example, when the contactor 101*a* of the DC power source 101 is turned off, the smoothing capacitor 102 is charged quickly, and thus the voltage of the DC power source line increases.

When the voltage of the DC power source line increases and exceeds the resistance voltage of the semiconductor switching elements 3*d* to 3*f* in a moment, the semiconductor switching elements 3*d* to 3*f* may be broken down. For this reason, it is necessary to measure the voltage of the DC power source line and lower the voltage of the DC power source line before the voltage breaking down the semiconductor switching elements 3*d* to 3*f* is applied.

Figure 6:
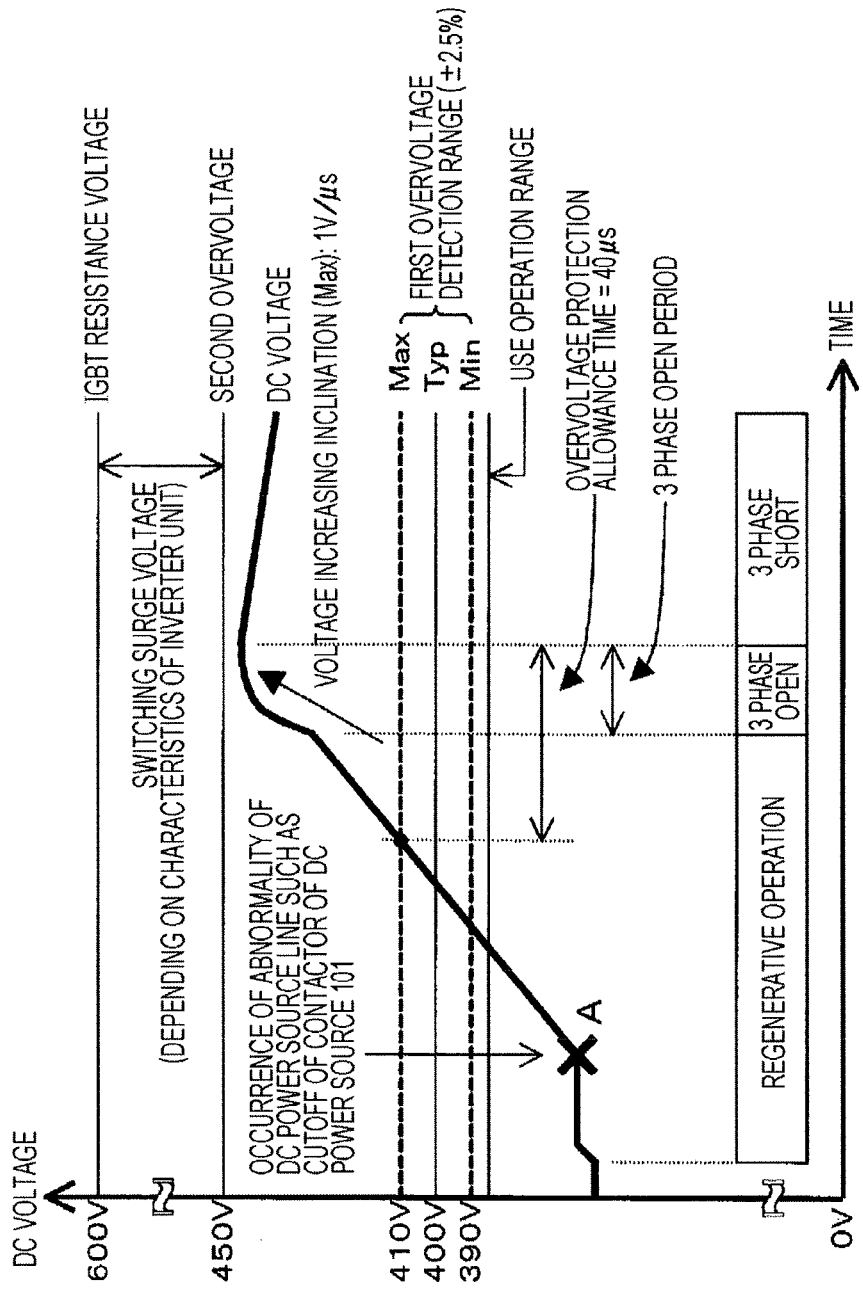
FIG. 6 is a diagram illustrating an operation of a protection circuit according to the invention, when an over voltage is detected in the power converter.

Accordingly, in the embodiment of the invention, as illustrated in FIG. 6, a threshold value determined in consideration of the resistance voltage of the semiconductor switching elements 3*d* to 3*f* and the delay time up to the execution of the protection operation is provided for the over voltage detection unit 106. When the over voltage of the DC power source line is detected, the 3 phase short is performed. Since the current flows back between the electrical motor 104 and the semiconductor switching elements 3*d* to 3*f* by the 3 phase short, it is possible to prevent the voltage of the DC power source line from increasing. At this time, the 3 phase short time depends on a rotation speed of the electrical motor or a driving situation of a vehicle.

Hereinafter, an over voltage detection threshold value will be described with reference to FIG. 6. A voltage to be applied to the semiconductor switching elements 3d to 3f (IGBT) is a voltage obtained by adding a switching surge to the voltage of the DC power source line, and thus it is necessary to perform protection so that the added voltage does not exceed the resistance voltage of the IGBT. Here, a DC voltage (that is, the over voltage detection threshold value) detected to transition to the protection operation is defined as a first over voltage and a DC voltage obtained by subtracting a switching surge voltage from the resistance voltage of the IGBT is defined as a second over voltage.

The first over voltage is set to be present between a use operation range of the IGBT and the second over voltage and is selected so as not to reach the second over voltage at the start time point of the protection operation without losing of the use operation range and regardless of detection variation or detection delay. The second over voltage is determined according to the characteristics of the IGBT and the inverter unit 103. In general, when the resistance voltage of the IGBT is set to be high, an ON voltage increases and heat generation increases. As a result, a method of improving a cooling property or an increase in a chip area is necessary, thereby causing deterioration in inverter efficiency, an increase in a size, and an increase in cost. Accordingly, it is important to lower the resistance voltage of the IGBT and the second over voltage as much as possible.

To lower the resistance voltage of the IGBT and the second over voltage as much as possible, detection accuracy of the detection of the first over voltage and a detection delay time are important factors. When the detection accuracy is low, it takes a long time until it is actually detected that the power source voltage exceeds the first over voltage in spite of the fact that the power source voltage exceeds the first over voltage. When the detection accuracy is high, the detection delay time (first over voltage detection delay time) can be shortened until it is detected that the power source voltage exceeds the first over voltage. Therefore, by setting the detection accuracy to be high, there is a room for insertion of a measurement noise removing filter although slight delay occurs. Further, the noise removing filter is imperative. However, since a sensor system is generally expensive with high accuracy, it is necessary to set appropriate accuracy and an appropriate delay time in a sensor that detects the over voltage.

When cutting off of the contract 101a of the DC power source 101 and the like occurs due to abnormality of the DC power source line at point A of FIG. 6 during the regenerative operation, the voltage of the DC power source line increases. For example, here, the degree of increase in the voltage is assumed to be about 1 V/μs. Further, a first over voltage detection range is assumed to be "400 V±10 V." When the voltage of the DC power source line increases up to the maximum value (Max) of the first over voltage detection range, the over voltage detection unit 106 outputs a 3 phase short signal (OV signal) after the first over voltage detection delay time. As a result, as described above, the operation transitions to the 3 phase short after a 3 phase open period of Δt1. At this time, the voltage immediately before the transition to the 3 phase short is required not to exceed the second over voltage which is the voltage obtained by subtracting the switching surge voltage from the resistance voltage of the IGBT.

In the example illustrated in FIG. 6, since the resistance voltage of the IGBT=600 V and the switching surge voltage of 150 V is set, the minimum difference between the second over voltage (450 V) and the first over voltage (400 V±10 V) is 40 V. Therefore, when the degree of increase in the voltage is set to about 1 V/1 μs, an over voltage protection allowance time is about 40 μs. Accordingly, it is necessary to set the detection accuracy of the detection of the first over voltage so that a sum of the first over voltage detection delay time and Δt1 is equal to or less than 40 μs.

The 3 phase short signal disappears, when the voltage of the DC power source line gradually drops after the transition to the 3 phase short and is less than the first over voltage detection range including hysteresis. As a result, the normal operation is recovered after transition from the 3 phase short to the 3 phase open.

Figure 7:
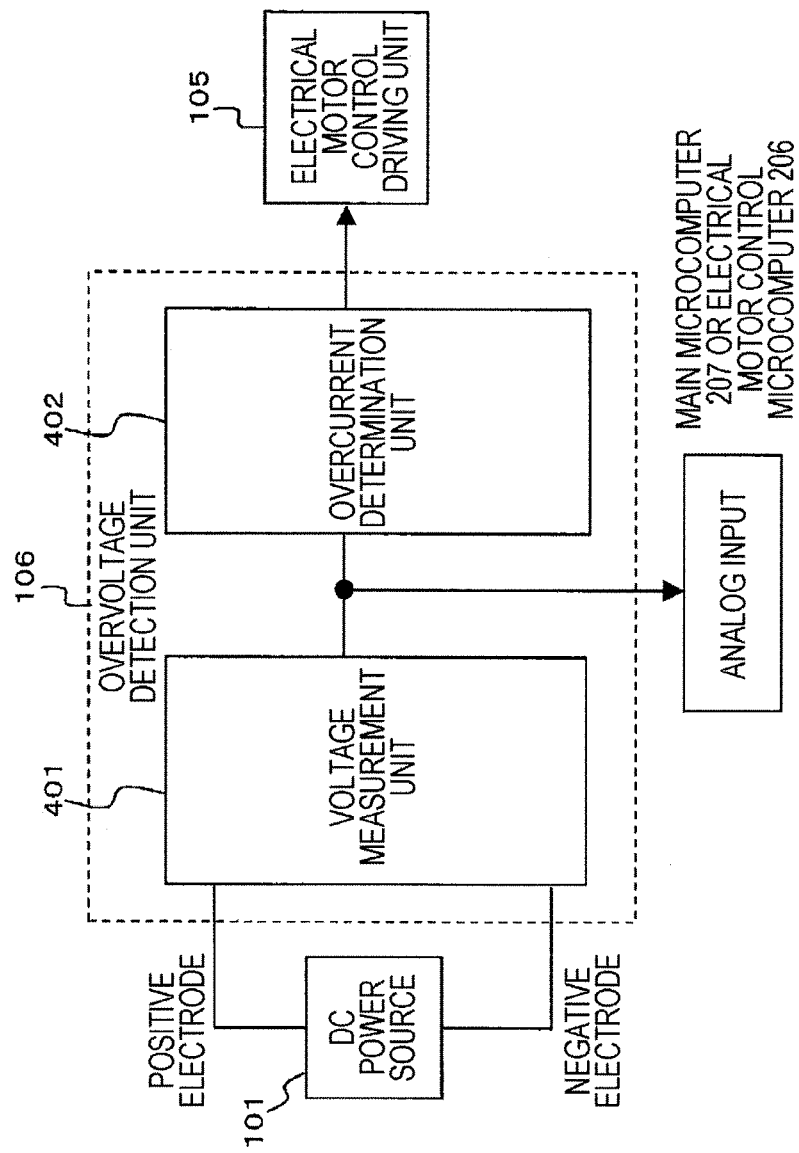
FIG. 7 is a block diagram illustrating an overview example of an over voltage detection unit 106 in FIG. 1 according to the embodiment.

FIG. 7 is a diagram illustrating an example of the over voltage detection unit 106. The over voltage detection unit 106 can be divided into a voltage measurement unit 401 and an over voltage determination unit 402. A voltage measured by the voltage measurement unit 401 is input to the over voltage determination unit 402 and is input also to the main microcomputer 207 or the electrical motor control microcomputer 206.

As a scheme for transition to the protection operation, there are a scheme of detecting the first over voltage by the main microcomputer 207 or the electrical motor control microcomputer 206 and causing the operation to transition to the protection operation and a scheme of causing the over voltage determination unit 402 to determine an over voltage and causing the operation to transition to the protection operation. As illustrated in FIG. 6, however, when it is necessary to transition to the protection operation within 40 μs in addition to the 3 phase open period, there is a possibility that the protection operation may be delayed for a calculation period of the main microcomputer 207 or the electrical motor control microcomputer 206. In this case, by configuring the over voltage determination unit 402 by an analog circuit to detect an over voltage and operating the protection operation with the configuration illustrated in FIG. 2 based on the detection result, the first over voltage detection delay time can be shortened and the over voltage protection operation can be performed within an over voltage allowance time. Further, by realizing a configuration in the same way even to detect an over current, the over current protection operation can be performed within an, over current allowance time.

In general, in the protection operation at the time of the over current, the current flowing in the IGBT is cutoff by the 3 phase open. As described above, however, in this embodiment of the invention, the protection operation at the time of the over current is performed by the 3 phase short.

At the time of the transition to the 3 phase short operation, a coil current of the electrical motor 104 transiently increases over a threshold value of the over current detection unit 107, and the over current detection signal OC is output in some cases.

When the protection operation at the time of the over current is performed not by the 3 phase short but by the 3 phase open in the related art, the braking effect in the 3 phase short may not be sufficiently obtained. For example, when an over current is detected due to a transitory current increase during the 3 phase short operation, the 3 phase short transitions to the 3 phase open (to perform this operation by the circuit illustrated in FIG. 2, the over current detection signal OC is input as a trigger signal used to perform the 3 phase open only to the buffer 201B, when the over current detection signal OC is output, and a circuit is added to block the other 3 phase short signals input to the driving signal control circuit). When an instruction source of the 3 phase short operation continues to give an instruction to perform the 3 phase short, the operation transitions to the 3 phase short operation again after the over current state is cancelled. Therefore, the 3 phase short operation and the phase open operation are repeated, and thus the sufficient brake effect may not be obtained by the 3 phase short.

Conventionally, when an over current is detected, the 3 phase open operation is performed. In the embodiment of the invention, however, even when the current transitorily increases in the 3 phase short operation, the protection operation by detecting an over current is the 3 phase short operation. Therefore, the 3 phase short operation can be continued without switching to the 3 phase open operation. As a result, for example, when the 3 phase short is performed for the over voltage protection and the over current is detected temporarily, the 3 phase short operation can continue. Therefore, the over voltage can be suppressed reliably by the effect of the 3 phase short. Further, even for the transitory current increase when the normal PWM control transitions to the 3 phase short operation by the electrical motor control microcomputer, the 3 phase short operation can continue. Therefore, even when the brake torque can be desired to be obtained in the 3 phase short operation, the effect can be reliably obtained.

(Description of Inverter Abnormality Detection Unit 108)

Next, an operation will be described when the inverter abnormality detection unit 108 detects abnormality of the inverter unit 103 and the gate fault signal is output from the inverter abnormality detection unit 108. As described above, the abnormality is determined, for example, when the short-circuit current of the IGBT is detected or the gate driving power source voltage of the IGBT is less than the threshold value.

When abnormality is detected in the inverter unit 103, there is a possibility that the semiconductor switching element or the like is already damaged. Therefore, since there is a possibility that short-circuit is generated inside the power converter including the inverter unit 103, the degree of urgency is higher compared to a case in which another abnormality occurs and it is necessary to cut off the connection between the DC power source 101 and the inverter unit 103 and the connection between the inverter unit 103 and the electrical motor 104. In this case, the output of the 3-state buffer 203B is cut off and the 3 phase open is performed quickly.

When the gate fault signal is input from the inverter abnormality detection circuit 108 to the electrical motor driving control unit 105, the gate fault signal is input to the buffer 203B. The buffer 203B is installed on the downstream side of the buffers 202UB and 202LB performing the 3 phase short in the switching control signal line, and thus has the highest priority among the buffers 201B, 202UB, 202LB, and 203B. When the gate fault signal is input as the trigger signal to the buffer 203B, the buffer 203B has the high impedance and the output from the buffer 203B is cut off.

Thus, no current flows in the light-emitting diode 210 of the opt-coupler of the gate driving circuit, all of the gate signal outputs of the semiconductor switching elements of the inverter unit 103 from the gate driving unit 109 enter the Low state, and thus the operation of all of the semiconductor switching elements stops and the semiconductor switching elements enter the non-conductive state. That is, the upper and lower arms enter the 3 phase open state.

Here, the reason for setting the protection operation to the 3 phase open is that the considered causes of the inverter abnormality include breakdown of the semiconductor switching element or short-circuit of the electrical motor. Therefore, to perform the operation of flowing a current to the semiconductor switching elements and the electrical motor, as in the 3 phase short, at the time of the detection of the inverter abnormality is considered not to be optimal in terms of reliability. Further, when the inverter abnormality detection unit 108 is configured to be able to detect a short-circuit current of the semiconductor switching elements, the gate fault signal with the threshold value higher than the value of the current flowing in the 3 phase short operation is set to be output. Consequently, the protection by the above-described 3 phase short is not inhibited.

The gate fault signal is in the Low state at the normal time. When the inverter abnormality detection unit is broken down due to any cause and the output enters the OFF state (high impedance), the input side of the buffer 2033 enters the High state by the pull-up resistor 203R. Thus, the output of the buffer 203B is cut off and the operation of all of the semiconductor switching elements stops and the semiconductor switching elements enter the non-conductive state, as in the case in which the gate fault signal is output to the buffer 203B. That is, the upper and lower arms enter the 3 phase open state.

(Substitution of Electrical Motor Control Microcomputer with Main Microcomputer)

In the embodiment of the invention, the main microcomputer 207 and the electrical motor control microcomputer 206 are provided. Normally, the electrical motor driving control unit 105 is controlled by the electrical motor control microcomputer 206. Therefore, when abnormality occurs in the electrical motor control microcomputer 206, there is a possibility that an abnormal operation of the electrical motor 104, a failure of the semiconductor switching elements 3a to 3f, or the like may be caused without a substitution function of the electrical motor control microcomputer 206.

Accordingly, when the main microcomputer 207 detects abnormality of the electrical motor control microcomputer 206, for example, when the main microcomputer 207 detects that power of the electrical motor control microcomputer 206 is down, safety of a vehicle is ensured by transmitting a signal of the 3 phase open or the 3 phase short from the main microcomputer 207 and performing the protection operation. In this case, by inputting rotation speed information (for example, a resolver signal) of the electrical motor to the main microcomputer 207, the 3 phase open or the 3 phase short may be selected according to the electrical motor rotation speed. For example, when abnormality of the electrical motor control microcomputer 206 is detected during high-speed driving of a vehicle, the vehicle is stopped or the speed of the vehicle is decreased to ensure the safety of the vehicle. Therefore, since the braking effect can be obtained by performing the 3 phase short, the vehicle can be stopped or the speed of the vehicle can be decreased quickly.

On the other hand, a case can be considered in which the 3 phase open signal or the 3 phase short signal is erroneously output from the main microcomputer 207 due to abnormality of the main microcomputer 207. Accordingly, when the electrical motor control microcomputer 206 diagnoses abnormality of the main microcomputer 207 and determines that the main microcomputer 207 is abnormal, the electrical motor control microcomputer 206 invalidates the control signal by the main microcomputer 207 by inputting an invalidation signal to the invalidation logics 208 and the 209 of the protection circuit unit 110. In the abnormality diagnosis of the main microcomputer 207, the abnormality is detected, for example, by confirming consistency of a solution (for example, a solution to an arithmetic instruction of "1+1") to an arithmetic instruction from the electrical motor control microcomputer 206 through the SPI communication. Further, in the abnormality diagnosis of the main microcomputer 207 and the electrical motor control microcomputer 206, erroneous detection can be prevented by confirming consistency using a plurality of microcomputers.

When the 3 phase open signal or the 3 phase short signal from the main microcomputer 207 is invalidated by the electrical motor control microcomputer, the electrical motor control microcomputer inputs the 3 phase open signal or the 3 phase short signal to the protection circuit unit 110.

Although not illustrated, an electric-powered vehicle actually includes a plurality of electrical motors such as a motor used in a compressor for an in-vehicle air-conditioner and power conversion circuits driving the electric motors. Each power conversion circuit includes an electrical motor control microcomputer. Since SPI connection is made between the electrical motor control microcomputer and the main microcomputer 207, consistency is confirmed using the plurality of electrical motor control microcomputers and the main microcomputer 207.

The invalidation of the control signal (the 3 phase open signal or the 3 phase short signal) of the main microcomputer 207 by the electrical motor control microcomputer 206 is performed, for example, by inputting an invalidation signal as a control signal of the 3-state buffer by use of the 3-state buffer and setting the output side to be high impedance.

Thus, even when the main microcomputer 207 outputs the 3 phase open signal or the 3 phase short signal, this signal is ignored in a case in which abnormality occurs on the side of the main microcomputer 207, thereby preventing the protection operation from being erroneously performed.

FIG. 8 is a diagram illustrating various trigger signals used to perform the 3 phase open or the 3 phase short in the protection operation in the above-described power converter according to the invention, outputs of the electrical motor control microcomputer 206 when the trigger signals are generated, and output states (ON: a normal output state and OFF: high impedance, that is, cutoff of output) of the 3-state buffers 201B, 202UB, 202LB, and 203B. The trigger signals are as follows in the order of the high priority:

1) the gate fault signal (3 phase open);
2a) the lower arm 3 phase short signal (3 phase short) by the over voltage detection signal OV;
2b) the upper arm 3 phase short signal (3 phase short) by the over voltage detection signal OV;
3a) the lower arm 3 phase short signal (3 phase short) by the over current detection signal OC;
3b) the lower arm 3 phase short signal (3 phase short) by the over current detection signal OC;
4a) the lower arm 3 phase short signal (3 phase short) by the main microcomputer;
4b) the upper arm 3 phase short signal (3 phase short) by the main microcomputer;
5) the 3 phase open signal (3 phase open) by the main microcomputer;
6a) the upper arm 3 phase short control by the electrical motor control microcomputer;
6b) the lower arm 3 phase short control by the electrical motor control microcomputer;
7) the 3 phase open control by the electrical motor control microcomputer; and
8) the normal operation (the PWM control by the electrical motor control microcomputer).

As described above, the control signal from the main microcomputer 207 is considered to be invalid, when the electrical motor control microcomputer 206 determines that the main microcomputer is abnormal. As another state, there is an electrical motor control microcomputer reset state (3 phase open). However, when the electrical motor control microcomputer 206 is reset, the motor control is not enabled. Therefore, the reset state is considered to be the 3 phase open by the 3 phase open signal from the main microcomputer 207.

In regard to the upper arm 3 phase short of 6a) above, the upper arm 3 phase short can be performed by setting all of the switching control signals of the plurality of semiconductor switching elements of the upper arm from the electrical motor control microcomputer 206 to be Low and setting all of the switching control signal of the plurality of semiconductor switching elements of the lower arm to be High. Further, in regard to the lower arm 3 phase short of 6b), the lower arm 3 phase short can be performed by setting all of the switching control signals of the plurality of semiconductor switching elements of the upper arm to be High and setting all of the switching control signals of the plurality of semiconductor switching elements of the lower arm to be Low. Even in the cases, likewise, it is necessary to input the switching control signals from the electrical motor control microcomputer directly to the gate driving unit 109 without inputting the control signal to the first to fourth protection circuits of the protection circuit units 110.

Likewise, the 3 phase open control of 7) above can be performed by setting all of the switching control signals of the plurality of semiconductor switching elements of the upper and lower arms from the electrical motor control microcomputer 206 to be High and turning off all of the plurality of semiconductor switching elements of the upper and lower arms. In this case, it is necessary to input the switching control signals from the electrical motor control microcomputer directly to the gate driving unit 109 without inputting the control signal to the first to fourth protection circuits of the protection circuit unit 110.

FIG. 9 is a detection order flowchart illustrating precedence of the triggers of the protection operation of performing the 3 phase open or the 3 phase short illustrated in FIG. 8. As described above, the control signal from the main microcomputer 207 is considered to be invalid, when the electrical motor control microcomputer 206 determines that the main microcomputer is abnormal. To facilitate the description, 2a) and 2b), 3a) and 3b), 4a) and 4b), and 6a) and 6b) in FIG. 8 are each summarized to one signal.

As described above, the power converter according to the embodiment of the invention performs the switching operation of the plurality of semiconductor switching elements 3a to 3c constituting the upper arm and the plurality of semiconductor switching elements 3d and 3f constituting the lower arm of the inverter unit 103. The power converter includes the inverter unit 103 that converts a DC current supplied from the DC power source 101 into an AC current and the electrical motor control microcomputer 206 which is a signal generation unit generating the switching signals controlling the switching operation of each of the semiconductor switching elements 3a to 3f. The power converter includes the gate driving unit 109 that outputs the generated switching signals as the gate control signals of the semiconductor switching elements of the inverter unit 103 and the electrical motor driving control unit 105. The electrical motor driving control unit 105 includes the buffers 201B, 202UB, 202LB, and 203B that output the switching signals output from the electrical motor control microcomputer without change at the time of a non-protection operation, output the control signals used to set the cutoff state or the conductive state of the semiconductor switching elements 3a to 3f as the switching signals of the semiconductor switching elements 3a to 3f to the gate driving unit 109, instead of the switching signals from the electrical motor control microcomputer at the time of the protection operation, and are connected in series to the switching signal lines between the electrical motor control microcomputer 206 and the gate driving unit 109.

Since the buffers 201B, 202UB, 202LB, and 203B are connected in series, the priority is higher as the buffers on the downstream side. For example, the buffer on the downstream side can be controlled by the control signal with the higher degree of urgency (for example, the buffer 203B can be controlled by the gate fault signal). Thus, when a plurality of abnormalities occur in the power source device, the priority can be given to the plurality of trigger signals of the 3 phase open or the 3 phase short respectively corresponding to the abnormalities and the 3 phase open or the 3 phase short can be performed according to the invention. Therefore, the control of the protection operation optimum to the vehicle state can be performed, while ensuring the higher safety.

The above-described embodiment can be modified as follows.

(1) In the above-described embodiment, the buffers 201B, 202UB, 202LB, and 203B, the 3 phase short driving signal control logic 204, and the timer circuit 205 are each discretely configured by hardware circuits and realizes the timing chart illustrated in FIG. 3. However, the timing chart illustrated in FIG. 3 can be realized also by a configuration of a PLD (Programmable Logic Device), an FPGA (Field Programmable Gate Array), a microcomputer, and a software program or the like executed by the microcomputer. In the configuration, the above-described protection function according to the invention can be realized only by one hardware device. However, to ensure the safety of the protection circuit, the buffers 201B, 202UB, 202LB, 203B, the 3 phase short driving signal control logic 204, the timer circuit 205, the electrical motor control microcomputer 206, and the main microcomputer 207 are preferably configured by independent circuits, respectively. At least, the buffers 201B, 202UB, 202LB, 203B and the 3 phase short driving signal control logic 204, the electrical motor control microcomputer, and the main microcomputer 207 are preferably configured by independent circuits, respectively.

With such a configuration, the gate fault signal, and the over voltage detection signal or the over current detection signal are detected by the plurality of control circuits, and thus the plurality of buffers are controlled by the plurality of control circuits. Since the 3 phase open or the 3 phase short of the semiconductor switching elements of the inverter unit 103 can be reliably performed, the sufficient safety of the power converter is ensured.

(2) In the 3 phase short, since the semiconductor switching elements 3a to 3c of the upper arm or the semiconductor switching elements 3d to 3f of the lower arm are turned on and the current flows back, heat is generated in the semiconductor switching elements of the turned-on side. Accordingly, to prevent the semiconductor switching elements from being broken down due to the heat, the changeover of the arm performing the phase short may be appropriately performed. This changeover may be performed under the control of the main microcomputer 207 or the electrical motor control microcomputer 206, the temperature detection signal from the temperature detection unit and the 3 phase short driving signal control logic 204, as described above, or another hardware circuit capable of performing the same operation. By providing temperature sensors in the upper and lower arms of the inverter unit 103, respectively, and outputting temperatures from the temperature sensors, the changeover of the arm performing the 3 phase short may be performed so that the temperature of the semiconductor switching elements of the upper arm is the same as that of the semiconductor switching elements of the lower arm.

(3) The power sources of the buffers 201B, 202UB, 202LB, and 203B are set as valid power sources, when at least one of the electrical motor control microcomputer 206 and the main microcomputer 207 operates. For example, a redundant power source supplying power to the electrical motor control microcomputer 206 and the main microcomputer 207 is used. The reason to realize such a configuration is, for example, that it is necessary to control the outputs of the buffers 201B, 202UB, 202LB, and 203B by the signal of the main microcomputer 207 and perform transition to the protection operation, when the control of the electrical motor 104 by the electrical motor control microcomputer 206 is disabled due to power source abnormality of the electrical motor control microcomputer 206. Further, the reason is that it is necessary to control the driving of the electrical motor by the electrical motor control microcomputer 206, even when the power source of the main microcomputer 207 is abnormal.

In the above-described embodiment, the first to fourth protection circuits are configured using the 3-state buffers. However, the invention is not limited to the 3-state buffers, as long as circuits having the same function as the above-described first to fourth protection circuits are used.

When the main microcomputer 207 detects abnormality in a vehicle including the power converter, the main microcomputer 207 outputs the 3 phase short signal (the upper arm 3 phase short signal or the lower arm 3 phase short signal) to the protection logic circuit 200, as necessary. Further, the 3 phase short signal may be generated, as necessary, not only based on abnormality of a vehicle but also based on, for example, an operation of a driver or a driving state of the vehicle.

The case in which the invention is applied to the power converter driving the electrical motor in an electric vehicle has been exemplified above. However, the invention is not limited to the electric vehicle using the electrical motor as a driving source, but can be applied also to a device which uses an electrical motor as a driving source and to which a load causing a large flywheel effect in the electrical motor is connected. The invention can be applied also to protection of a semiconductor switching element in an inverter used in a power-generation apparatus such as wind power generation.

The above-described respective embodiments may be realized solely or may be combined. This is because the effects of the respective embodiments can be obtained solely or synergically. Further, the invention is not limited to the above-described embodiments, as long as the characteristic of the invention is not impaired.

The invention claimed is:

1. A power converter comprising:
an inverter unit that includes a plurality of semiconductor switching elements constituting an upper arm and a plurality of semiconductor switching elements constituting a lower arm, and converts DC power into AC power and outputs the AC power;
a gate driving unit that outputs, to the inverter unit, a gate signal used to drive gates of the plurality of semiconductor switching elements of the upper and lower arms and turn on/off the semiconductor switching elements;
a driving control unit that supplies the gate driving unit with a switching control signal used for the gate driving unit to output the gate signal;
a first abnormality detection unit that detects abnormality of the inverter unit by performing over voltage detection of the DC power and over current detection of the AC power and temperature detection of the upper and lower arms; and
a second abnormality detection unit that detects the abnormality of the inverter unit by detecting abnormality of each of the plurality of semiconductor switching elements constituting the upper arm and the plurality of semiconductor switching elements constituting the lower arm, wherein the driving control unit includes a first protection circuit unit that performs a protection operation when the first abnormality detection unit detects the abnormality of the inverter unit, and a second protection circuit unit that performs the protection operation when the second abnormality detection unit detects the abnormality of the inverter unit.

2. The power converter according to claim 1, wherein the driving control unit further includes a high-order control unit and a control unit that generates the switching control signal based on a signal from the high-order control unit, wherein the first protection circuit unit includes first, second, and third protection circuits, wherein the second protection circuit unit includes a fourth protection circuit, and wherein the first to fourth protection circuits are arranged in order between the control unit and the gate driving unit.

3. The power converter according to claim 2, wherein the first abnormality detection unit includes an over voltage detection unit that detects an over voltage between positive and negative electrodes of the inverter unit and inputs an over voltage detection signal to the driving control unit, an over current detection unit that detects an over current of AC power output of the inverter unit and inputs an over current detection signal to the driving control unit, and a temperature detection unit that detects temperatures of the upper and lower arms and inputs a temperature detection signal to the driving control unit.

4. The power converter according to claim 3, wherein the first protection circuit unit controls the first to third protection circuits and controls an input of the gate signal to the inverter unit by outputting a first control signal, a second control signal, and a third control signal to the first protection circuit, the second protection circuit, and the third protection circuit, respectively, based on the over voltage detection signal, the over current detection signal, the temperature detection signal, a signal input from the high-order control unit and used to turn off all of the plurality of semiconductor switching elements constituting the upper and lower arms, and a signal input from the high-order control unit and used to turn on all of the plurality of semiconductor switching elements constituting the upper arm or a signal input from the high-order control unit and used to turn on all of the plurality of semiconductor switching elements constituting the lower arm.

5. The power converter according to claim 4, wherein, by delaying rising timings of the second and third control signals by a first predetermined time than a rising timing of the first control signal and delaying a falling timing of the first control signal by a second predetermined time than a falling timing than falling timings of the second and third control signals, the semiconductor switching elements of the upper arm and the semiconductor switching elements of the lower arm connected in series to the semiconductor switching elements of the upper arm are not simultaneously turned on.

6. The power converter according to claim 4, wherein the first protection circuit unit includes a protection logic circuit, wherein, when the first control signal (High) is input to the first protection circuit, the first protection circuit outputs the first control signal (High) to the second and third protection circuits, instead of the switching control signal from the control unit, wherein, when the second control signal (High) is input to the second protection circuit, a signal (Low) inverted from the second control signal (High) is output to the fourth protection circuit, instead of an output signal from the first protection circuit, so that only the plurality of semiconductor switching elements of the upper arm are turned on, wherein, when the third control signal (High) is input to the third protection circuit, a signal (Low) inverted from the third control signal (High) is output to the fourth protection circuit, instead of the output signal from the first protection circuit, so that only the plurality of semiconductor switching elements of the lower arm are turned on, and wherein the protection logic circuit outputs the second control signal and the third control signal based on the over voltage detection signal, the over current detection signal, the temperature detection signal, the signal input from the high-order control unit and used to turn off all of the plurality of semiconductor switching elements constituting the upper and lower arms, and the signal input from the high-order control unit and used to turn on all of the plurality of semiconductor switching elements constituting the upper arm or the signal input from the high-order control unit and used to turn on all of the plurality of semiconductor switching elements constituting the lower arm.

7. The power converter according to claim 6, wherein the protection logic circuit includes a timer circuit and a 3 phase short logic circuit, wherein the 3 phase short logic circuit includes a first delay circuit that delays a rising timing of the second control signal by a first predetermined time and delays a falling timing of the second control signal by a third predetermined time, and a second delay circuit that delays a rising timing of the third control signal by the first predetermined time and delays a falling timing of the second control signal by a third predetermined time shorter than the first predetermined time, and wherein the timer circuits delays a falling timing of the first control signal by a second predetermined time, so that the semiconductor switching elements of the upper arm and the semiconductor switching elements of the lower arm connected in series to the semiconductor switching elements of the upper arm are not simultaneously turned on.

8. The power converter according to claim 2, wherein the second abnormality detection unit inputs a semiconductor switching element abnormality detection signal to the driving control unit, when detecting abnormality of each of the plurality of semiconductor switching elements constituting the upper arm and the plurality of semiconductor switching elements constituting the lower arm, and wherein the second protection circuit unit inputs the semiconductor switching element abnormality detection signal to the fourth protection circuit as a fourth control signal (High) to the fourth protection circuit to control an input of the gate signal to the inverter unit so that all of the semiconductor switching elements of the upper and lower arms are turned off.

9. The power converter according to claim 4,
wherein, when the over voltage detection signal is input to the first protection circuit unit, the first protection circuit unit controls the input of the gate signal to the inverter unit such that all of the plurality of semiconductor switching elements of the upper arm are turned on and all of the plurality of semiconductor switching elements of the lower arm are turned off, or all of the semiconductor switching elements of the upper arm are turned off and all of the semiconductor switching elements of the lower arm are turned on.

10. The power converter according to claim 4,
wherein, when the over current detection signal is input to the first protection circuit unit, the first protection circuit unit controls the input of the gate signal to the inverter unit so that all of the plurality of semiconductor switching elements of the upper arm are turned on and all of the plurality of semiconductor switching elements of the lower arm are turned off, or all of the plurality of semiconductor switching elements of the upper arm are turned off and all of the semiconductor switching elements of the lower arm are turned on.

11. The power converter according to claim 4,
wherein, when a signal used to turn on all of the plurality of semiconductor switching elements constituting the upper arm is input from the high-order control unit to the first protection circuit unit, the first protection circuit unit controls the input of the gate signal to the inverter unit so that all of the plurality of semiconductor switching elements of the upper arm are turned on and all of the plurality of semiconductor switching elements of the lower arm are turned off.

12. The power converter according to claim 4,
wherein, when a signal used to turn on all of the plurality of semiconductor switching elements constituting the lower arm is input from the high-order control unit, the first protection circuit unit controls the input of the gate signal to the inverter unit so that all of the plurality of semiconductor switching elements of the lower arm are turned on and all of the plurality of semiconductor switching elements of the upper arm are turned off.

13. The power converter according to claim 4,
wherein, when a signal used to turn off all of the plurality of semiconductor switching elements constituting the upper and lower arms is input from the high-order control unit to the first protection circuit unit, the first protection circuit unit controls the input of the gate signal to the inverter unit so that all of the plurality of semiconductor switching elements of the upper and lower arms are turned off.

14. The power converter according to claim 2,
wherein each of the first to fourth protection circuits includes a 3-state buffer.

15. The power converter according to claim 6,
wherein the protection logic circuit further includes an invalidation logic, and
wherein under the control of the control unit, the invalidation logic cuts off the signal output from the high-order control unit and used to turn on all of the plurality of semiconductor switching elements constituting the upper arm, and the signal output from the high-order control unit and used to turn on all of the plurality of semiconductor switching elements constituting the upper arm or the signal output from the high-order control unit and used to turn on all of the plurality of semiconductor switching elements constituting the lower arm.

* * * * *